United States Patent
Capalik et al.

(10) Patent No.: US 9,954,872 B2
(45) Date of Patent: *Apr. 24, 2018

(54) SYSTEM AND METHOD FOR IDENTIFYING UNAUTHORIZED ACTIVITIES ON A COMPUTER SYSTEM USING A DATA STRUCTURE MODEL

(71) Applicant: COUNTERTACK INC., Santa Monica, CA (US)

(72) Inventors: Alen Capalik, Pacific Palisades, CA (US); David Andrews, Los Angeles, CA (US); Ben Becker, Santa Monica, CA (US)

(73) Assignee: COUNTERTACK INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,916

(22) Filed: Aug. 11, 2015

(65) Prior Publication Data

US 2015/0381638 A1 Dec. 31, 2015

Related U.S. Application Data

(63) Continuation of application No. 13/163,590, filed on Jun. 17, 2011, now Pat. No. 9,106,697.

(60) Provisional application No. 61/358,367, filed on Jun. 24, 2010.

(51) Int. Cl.
*G06F 11/00* (2006.01)
*H04L 29/06* (2006.01)

(52) U.S. Cl.
CPC ...... *H04L 63/1416* (2013.01); *H04L 63/1491* (2013.01)

(58) Field of Classification Search
CPC .............. H04L 63/1416; H04L 63/1491
USPC ................ 726/23, 25, 1, 2, 26, 27
See application file for complete search history.

(56) References Cited

U.S. PATENT DOCUMENTS

| | | | |
|---|---|---|---|
| 5,339,426 | A | 8/1994 | Aoshima |
| 5,621,886 | A | 4/1997 | Alpert et al. |
| 5,664,159 | A | 9/1997 | Richter et al. |
| 5,740,413 | A | 4/1998 | Alpert et al. |
| 6,009,274 | A | 12/1999 | Fletcher et al. |
| 6,279,113 | B1 | 8/2001 | Vaidya |

(Continued)

FOREIGN PATENT DOCUMENTS

| | | |
|---|---|---|
| JP | 2005-316779 | 11/2005 |
| WO | WO 2006/113781 A1 | 10/2006 |
| WO | WO 2007/027739 | 3/2007 |

OTHER PUBLICATIONS

Dagon et al. HoneyStat: Local Worm Detection Using Honeypots, pp. 39-58, 2004.*

(Continued)

*Primary Examiner* — Thu Ha Nguyen
(74) *Attorney, Agent, or Firm* — Morgan, Lewis & Bockius LLP

(57) ABSTRACT

A computer implemented method includes monitoring activity on the virtual machine. A plurality of activities being performed at the virtual machine is identified. Each of the activities includes an activity source, an activity target, and an association between the activity source and the activity target. The activity information is stored in the memory. The one or more of the activity sources, activity targets, and associations are transmitted to prevent future attacks.

21 Claims, 17 Drawing Sheets

(56) References Cited

U.S. PATENT DOCUMENTS

| | | | |
|---|---|---|---|
| 6,343,280 B2 | 1/2002 | Clark | |
| 6,360,327 B1 | 3/2002 | Hobson | |
| 6,446,062 B1 | 9/2002 | Levine et al. | |
| 7,222,366 B2 | 5/2007 | Bruton, III et al. | |
| 7,392,543 B2 | 6/2008 | Szor | |
| 7,464,407 B2 | 12/2008 | Nakae et al. | |
| 7,581,219 B2* | 8/2009 | Neiger | G06F 12/1491 711/6 |
| 7,596,654 B1* | 9/2009 | Wong | G06F 12/0813 703/21 |
| 7,996,836 B1 | 8/2011 | McCorkendale et al. | |
| 8,204,984 B1* | 6/2012 | Aziz | H04L 63/0227 709/224 |
| 8,365,180 B2* | 1/2013 | Kawasaki | G06F 9/45516 718/1 |
| 8,448,170 B2* | 5/2013 | Wipfel | H04L 9/3213 718/1 |
| 8,539,582 B1* | 9/2013 | Aziz | G06F 21/554 713/150 |
| 8,572,613 B1* | 10/2013 | Brandwine | G06F 9/45533 714/38.1 |
| 8,683,548 B1* | 3/2014 | Curry | G06F 21/57 713/152 |
| 8,776,050 B2* | 7/2014 | Plouffe | G06F 9/45537 718/1 |
| 8,943,506 B2* | 1/2015 | Tang | G06F 9/45558 718/1 |
| 8,949,826 B2* | 2/2015 | Fitzgerald | G06F 9/45537 718/1 |
| 2001/0011254 A1 | 8/2001 | Clark | |
| 2002/0099752 A1 | 7/2002 | Markos et al. | |
| 2002/0166063 A1 | 11/2002 | Lachman, III et al. | |
| 2002/0194437 A1 | 12/2002 | Kapoor et al. | |
| 2003/0023656 A1* | 1/2003 | Hutchison | G06F 9/524 718/100 |
| 2003/0120935 A1 | 6/2003 | Teal et al. | |
| 2004/0025052 A1 | 2/2004 | Dickenson | |
| 2004/0153672 A1 | 8/2004 | Watt et al. | |
| 2004/0177269 A1 | 9/2004 | Belnet et al. | |
| 2004/0225877 A1 | 11/2004 | Huang | |
| 2005/0229250 A1 | 10/2005 | Ring et al. | |
| 2006/0018466 A1 | 1/2006 | Adelstein et al. | |
| 2006/0031673 A1 | 2/2006 | Beck et al. | |
| 2006/0101516 A1 | 5/2006 | Sudaharan et al. | |
| 2006/0136720 A1* | 6/2006 | Armstrong | G06F 21/53 713/164 |
| 2006/0242703 A1 | 10/2006 | Abeni | |
| 2006/0288414 A1 | 12/2006 | Kuroda | |
| 2006/0294592 A1* | 12/2006 | Polyakov | G06F 21/566 726/24 |
| 2007/0002689 A1 | 1/2007 | Mateescu et al. | |
| 2007/0101431 A1 | 5/2007 | Clift et al. | |
| 2007/0180450 A1* | 8/2007 | Croft | G06F 3/1415 718/1 |
| 2007/0180529 A1 | 8/2007 | Costea et al. | |
| 2007/0240221 A1 | 10/2007 | Tuvell et al. | |
| 2007/0250930 A1* | 10/2007 | Aziz | G06F 21/554 726/24 |
| 2008/0005782 A1* | 1/2008 | Aziz | G06F 9/45537 726/3 |
| 2008/0016571 A1 | 1/2008 | Chang | |
| 2008/0127114 A1 | 5/2008 | Vasudevan | |
| 2008/0177994 A1* | 7/2008 | Mayer | G06F 9/4418 713/2 |
| 2008/0222729 A1* | 9/2008 | Chen | G06F 21/566 726/24 |
| 2008/0320594 A1* | 12/2008 | Jiang | G06F 21/566 726/24 |
| 2009/0307273 A1* | 12/2009 | Johnson | G06F 21/55 |
| 2010/0042632 A1* | 2/2010 | Johnson | G06F 11/3476 707/725 |
| 2010/0095281 A1 | 4/2010 | Raber | |
| 2010/0153693 A1 | 6/2010 | Stall et al. | |
| 2010/0306179 A1 | 12/2010 | Lim | |
| 2011/0060947 A1* | 3/2011 | Song | G06F 21/53 714/37 |
| 2011/0179136 A1* | 7/2011 | Twitchell, Jr. | H04L 45/586 709/217 |
| 2011/0239291 A1* | 9/2011 | Sotka | H04L 63/1408 726/14 |
| 2011/0321165 A1* | 12/2011 | Capalik | G06F 11/3471 726/25 |
| 2011/0321166 A1* | 12/2011 | Capalik | H04L 63/1416 726/25 |
| 2012/0167063 A1 | 6/2012 | Detwiler et al. | |
| 2012/0174186 A1 | 7/2012 | Aziz et al. | |
| 2012/0179904 A1* | 7/2012 | Dunn | G06F 21/575 713/155 |
| 2012/0255012 A1* | 10/2012 | Sallam | G06F 21/52 726/24 |
| 2012/0255018 A1* | 10/2012 | Sallam | G06F 12/14 726/24 |
| 2012/0331553 A1* | 12/2012 | Aziz | G06F 21/554 726/23 |
| 2013/0047257 A1 | 2/2013 | Aziz | |
| 2013/0238785 A1* | 9/2013 | Hawk | G06F 9/5072 709/224 |
| 2013/0254870 A1 | 9/2013 | Sotka | |
| 2013/0304903 A1* | 11/2013 | Mick | H04L 43/0817 709/224 |
| 2014/0026121 A1* | 1/2014 | Jackson | G06F 9/44521 717/124 |
| 2014/0096131 A1* | 4/2014 | Sonnek | G06F 21/53 718/1 |
| 2014/0108635 A1 | 4/2014 | Khemani et al. | |

OTHER PUBLICATIONS

Capalik, Certificate of Grant, AU2011271157, dated Jan. 7, 2016, 1 pg.

NeuralIQ Inc., Office Action, AU 2008242296, dated Apr. 5, 2012, 2 pgs.

NeuralIQ Inc., Examination Report, AU2011271157, dated Mar. 13, 2015, 4 pgs.

Asrigo, Using VMM-Based Sensors to Monitor Honeypots, Jun. 14, 2006, 11 pgs.

Capalik, Final Office Action, U.S. Appl. No. 11/788,795, dated Aug. 14, 2014, 18 pgs.

Capalik, Examiner's Answer, U.S. Appl. No. 11/788,795, dated May 31, 2011, 19 pgs.

Capalik, Notice of Allowance, U.S. Appl. No. 11/788,743, dated Oct. 24, 2012, 9 pgs.

Capalik, Notice of Allowance, U.S. Appl. No. 13/759,335, dated Oct. 9, 2013, 10 pgs.

Capalik, Notice of Allowance, U.S. Appl. No. 13/163,590, dated Apr. 10, 2015, 5 pgs.

Capalik, Final Office Action, U.S. Appl. No. 13/163,590, dated Aug. 15, 2014, 11 pgs.

Capalik, Notice of Allowance, U.S. Appl. No. 13/163,590, dated May 1, 2014, 5 pgs.

Capalik, Office Action, U.S. Appl. No. 13/163,590, dated Oct. 25, 2013, 11 pgs.

Capalik, Office Action, U.S. Appl. No. 11/488,743, dated Aug. 4, 2010, 22 pgs.

Capalik, Office Action, U.S. Appl. No. 11/488,743, dated Feb. 16, 2010, 23 pgs.

Capalik, Office Action, U.S. Appl. No. 11/488,743, dated Jan. 18, 2011, 23 pgs.

Capalik, Office Action, U.S. Appl. No. 11/488,743, dated Jul. 30, 2009, 21 pgs.

Capalik, Office Action, U.S. Appl. No. 11/788,795, dated Dec. 1, 2010, 19 pgs.

Capalik, Office Action, U.S. Appl. No. 11/788,795, dated Jun. 9, 2010, 14 pgs.

Capalik, Office Action, U.S. Appl. No. 13/163,578, dated Nov. 1, 2013, 15 pgs.

(56) References Cited

OTHER PUBLICATIONS

Capalik, Office Action, U.S. Appl. No. 13/759,335, dated Jun. 14, 2013, 32 pgs.
Capalik, Office Action, U.S. Appl. No. 14/542,376, dated Jul. 23, 2015, 10 pgs.
CounterTack Inc., Certificate of Grant, EP08745858.4, dated Aug. 5, 2015, 1 pg.
CounterTack Inc., Extended European Search Report, EP15174670.8, dated Nov. 11, 2015, 4 pgS.
Dagon et al., "HoneyStat: Local Worm Detection Using Honeypots," Recent Advances in Intrusion Detection, Springer Berlin Heidelberg, 2004, 20 pgs.
Debug Register, Aus Lowlevel, Mar. 22, 2010, 2 pgs.
European Network of Affined Honeypots, D1.2: Attack Detection and Signature Generation, May 11, 2006.
Anonymous, Wikipedia, "Honeypot (Computing)" http://en.wikipedia.org/wiki/Honeypot, Jul. 17, 2006, 4 pgs.
Anonymous, Wikipedia, "Intrusion-Detection System" http://en.wikipedia.org/wiki/Intrusion_detection_system, Jul. 17, 2006, 3 pgs.
ISR, PCT/US08/60336, dated Aug. 11, 2008.
Joshi, Detecting Past and Present Intrusions Through Vulnerability Specific Predicates, SOSP'05, Brighton, UK, Oct. 23-26, 2005, 14 pgs.
Krapf, XEN memory management, Oct. 30, 2007, 5 pgs.
Liang, Fast and Automated Generation of Attach Signatures: A Basis for Building Self-Protecting Servers, Nov. 7-11, 2005.
Litty, Hypervisor support for identifying covertly executing binaries, Dec. 31, 2008, 16 pgs.
NeuralIQ Inc., Decision to Grant a Patent, JP 2010-504185, dated Jul. 26, 2013, 1 pg.
NeuralIQ Inc., Extended European Search Report, 08745858-4, dated Jun. 12, 2014, 4 pgs.
NeuralIQ Inc., International Search Report / Written Opinion, PCT/US2011/041119, dated Oct. 4, 2011, 12 pgs.
NeuralIQ Inc., International Search Report / Written Opinion, PCT/US2011/041122, dated Sep. 21, 2011, 12 pgs.
NeuralIQ Inc., Notice of Reasons for Rejection, JP 2010-504185, dated Mar. 15, 2013, 4 pgs.
NeuralIQ Inc., Office Action, CA 2,689,126, dated Aug. 15, 2012, 3 pgs.
NeuralIQ Inc., Office Action, CA 2,689,126, dated Jan. 23, 2014, 3 pgs.
NeuralIQ Inc., Office Action, CA 2,689,126, dated Mar. 6, 2015, 3 pgs.
NeuralIQ Inc., Patent Examination Report No. 1, AU 2011271157, dated Dec. 16, 2013, 4 pgs.
Provos, A Virtual Honeypot Framework, Oct. 21, 2003, 11 pgs.
Shibuya, A study for some experiences of the Operation of Highly Interactive Decoy System, Aug. 10, 2004, 10 pgs.
Tian, A Study of Intrusion Signature Based on Honeypot, Parallel and Distributed Computing, Applications and Technologies, PDCAT'2005, Dec. 8, 2005, pp. 125-129.
Zhang, Honeypot: a supplemented active defense system for network security, Parallel and Distributed Computing, Applications and Technologies, PDCAT'2003, Aug. 29, 2003, pp. 231-235.
Capalik, Office Action, U.S. Appl. No. 14/542,376, dated Jun. 22, 2016, 13 pgs.
CounterTack Inc., International Search Report and Written Opinion, PCTUS2016/012533, dated Jun. 16, 2016, 12 pgs.
CounterTack Inc., Decision to Grant, EP15174670.8, dated Sep. 14, 2016, 5 pgs.
CounterTack Inc., Certificate of Grant, EP15174670.8, dated Sep. 14, 2016, 1 pg.
Capalik, Final Office Action, U.S. Appl. No. 14/542,376, dated Apr. 24, 2017, 17 pgs.
CounterTack Inc., Communication Pursuant to Article 94(3), EP11729826.5, dated Jun. 22, 2017, 5 pgs.
CounterTack Inc., Intent to Grant, EP11731194.4, dated Jul. 20, 2017, 6 pgs.
CounterTack Inc., International Preliminary Report on Patentability, PCTUS2016/012533, dated Jul. 11, 2017, 8 pgs.
CounterTack Inc., Office Action, CA 2,689,126, dated Jun. 2, 2017, 3 pgs.

* cited by examiner

| source 1 512-1 | Value 1 522-1 | Method 1 524-1 |
| source 2 512-2 | Value 2 522-2 | Method 2 524-2 |
| source 3 512-3 | Value 3 522-3 | Method 3 524-3 |
| source 4 512-4 | Value 4 522-4 | Method 4 524-4 |
| source 5 512-5 | Value 5 522-5 | Method 5 524-5 |
| ⋮ | ⋮ | ⋮ |

SYSTEM AND METHOD FOR IDENTIFYING UNAUTHORIZED ACTIVITIES ON A COMPUTER SYSTEM USING A DATA STRUCTURE MODEL

RELATED APPLICATIONS

This application is a continuation application of U.S. patent application Ser. No. 13/163,590, filed Jun. 17, 2011, entitled "System and Method for Identifying Unauthorized Activities on a Computer System Using a Data Structure Model," which claims priority to U.S. Provisional Patent Application Ser. No. 61/358,367, filed on Jun. 24, 2010, entitled "System and Method for Identifying Unauthorized Activities on a Computer System Using a Data Structure Model," both of which are incorporated by reference herein in their entireties.

This relates to U.S. patent application Ser. No. 13/163,578, entitled "System and Method for Sampling Forensic Data of Unauthorized Activities Using Executability States" filed Jun. 17, 2011, which claims priority to U.S. Provisional Patent Application Ser. No. 61/358,363 filed on Jun. 24, 2010, entitled "System and Method for Sampling Forensic Data of Unauthorized Activities Using Executability States," and U.S. Provisional Patent Application Ser. No. 61/358,367, filed on Jun. 24, 2010, entitled "System and Method for Identifying Unauthorized Activities on a Computer System Using a Data Structure Model," all of which are incorporated by reference herein in their entireties.

This application relates to U.S. patent application Ser. No. 11/788,795, entitled "System and Method for Analyzing Unauthorized Intrusion into a Computer Network," filed on Apr. 20, 2007, which is a continuation-in-part of U.S. patent application Ser. No. 11/488,743, entitled "Decoy Network Technology With Automatic Signature Generation for Intrusion Detection and Intrusion Prevention Systems," filed on Jul. 17, 2006, which claims priority to U.S. Provisional Patent Application Ser. No. 60/802,543, filed May 22, 2006, all of which are incorporated herein by reference in their entireties.

TECHNICAL FIELD

This invention relates generally to systems and methods for protecting computer networks, including but not limited to systems and methods for analyzing malicious activities on a computer system in order to better protect the computer system from future malicious activity.

BACKGROUND

An increasing number of computers are connected to computer networks (e.g., the Internet). Networked computers provide a significant benefit of accessing and sharing data over the networks. However, these networked computers are also vulnerable to attacks, unwanted intrusions, and unauthorized access.

Certain existing network security systems have been developed to protect computers from attacks, unwanted intrusions, unauthorized access, and other malicious activities. Such network security systems typically include a firewall to prevent unauthorized access to the network or its computers. Exemplary network security systems also include intrusion detection systems (IDS) and intrusion prevention systems (IPS) that typically contain a library of malware fingerprints (e.g., fingerprints of malware payloads and other unauthorized activities). By using the malware fingerprints, the IDS or the IPS can detect attempts to access computer systems without authorization. When a connection is attempted to a network port, the IDS or IPS examines the low-level IP data packets and compares them to its library of fingerprints for a match. When a match is identified, the IDS or IPS provides notification of the match and/or prevents further access. Therefore, the malware fingerprints play a critical role in network security.

A critical threat to computer networks is the so-called zero-day attack that exploits security vulnerabilities previously unknown to software developers or system operators. Because the security vulnerabilities are unknown to the software developers or system operators, often the fingerprints of such zero-day attacks are unavailable for comparison. Until the fingerprints are identified, attacks exploiting the same security vulnerabilities continue without detection by the network security systems. However, identifying the fingerprints of malicious activities in the middle of numerous other non-malicious processes is not a trivial task.

Because network security systems depend on the malware fingerprints, there is a great need for efficient methods of identifying fingerprint data for previously unknown types of malicious and/or unauthorized activities.

SUMMARY

A number of embodiments that address the limitations and disadvantages described above are presented in more detail below. These embodiments provide computer-implemented methods and systems for generating fingerprint data for zero-day unauthorized activities.

As described in more detail below, some embodiments involve a computer-implemented method performed at a computer system having one or more processors and memory storing one or more programs for execution by the one or more processors. The method includes monitoring activity on the virtual machine. A plurality of activities performed at a virtual machine is identified. Each of the activities includes an activity source, an activity target, and an association between the activity source and the activity target. The activity sources, activity targets, and associations are stored in the memory. A fingerprint indicative of the activity on the virtual machine is created from the stored activities. The fingerprint is transmitted to one or more other computer systems on the network to prevent future attacks that comprise the same or similar activities as indicated by the fingerprint. In some embodiments, the fingerprint is transmitted to identify the attack on other affected systems.

In accordance with some embodiments, the system includes one or more processors, and memory. The memory stores a virtual machine, a virtual machine monitor supervising the virtual machine, and one or more programs. The virtual machine, the virtual machine monitor, and the one or more programs are configured for execution by the one or more processors. The one or more programs include instructions for monitoring activity on the virtual machine, and instructions for identifying a plurality of activities being performed at the virtual machine. Each of the activities includes an activity source, an activity target, and an association between the activity source and the activity target. The one or more programs furthermore include instructions for storing the activity sources, activity targets, and associations in the memory. The one or more programs also include instructions for creating a fingerprint indicative of the activity on the virtual machine from the stored activities. Finally, the one or more programs include instructions for transmitting the fingerprint to one or more other computer systems on the network to prevent future attacks that comprise the same or similar activities as indicated by the fingerprint. In some embodiments, the one or more programs include instructions for displaying at least a subset of the activities (e.g., action sources, action targets, and actions).

In accordance with some embodiments, a computer readable storage medium stores one or more programs configured for execution by one or more processors of a computer. The one or more programs include instructions for performing the method described above.

These embodiments identify unauthorized activities by monitoring and identifying associations between activity sources and activity targets without using pre-determined fingerprints. The data collected by these embodiments can be used to generate fingerprint data in response to the zero-day attacks.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 5C illustrates another exemplary data structure of fingerprint, in accordance with some embodiments.

DESCRIPTION OF EMBODIMENTS

Embodiments of various systems and methods for identifying unauthorized activities are described below. Reference will be made to certain embodiments of the invention, examples of which are illustrated in the accompanying drawings. While the invention will be described in conjunction with the embodiments, it should be understood that these particular embodiments are not intended to limit the invention. Instead, the invention is intended to cover alternatives, modifications and equivalents that are within the spirit and scope of the invention as defined by the appended claims. Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
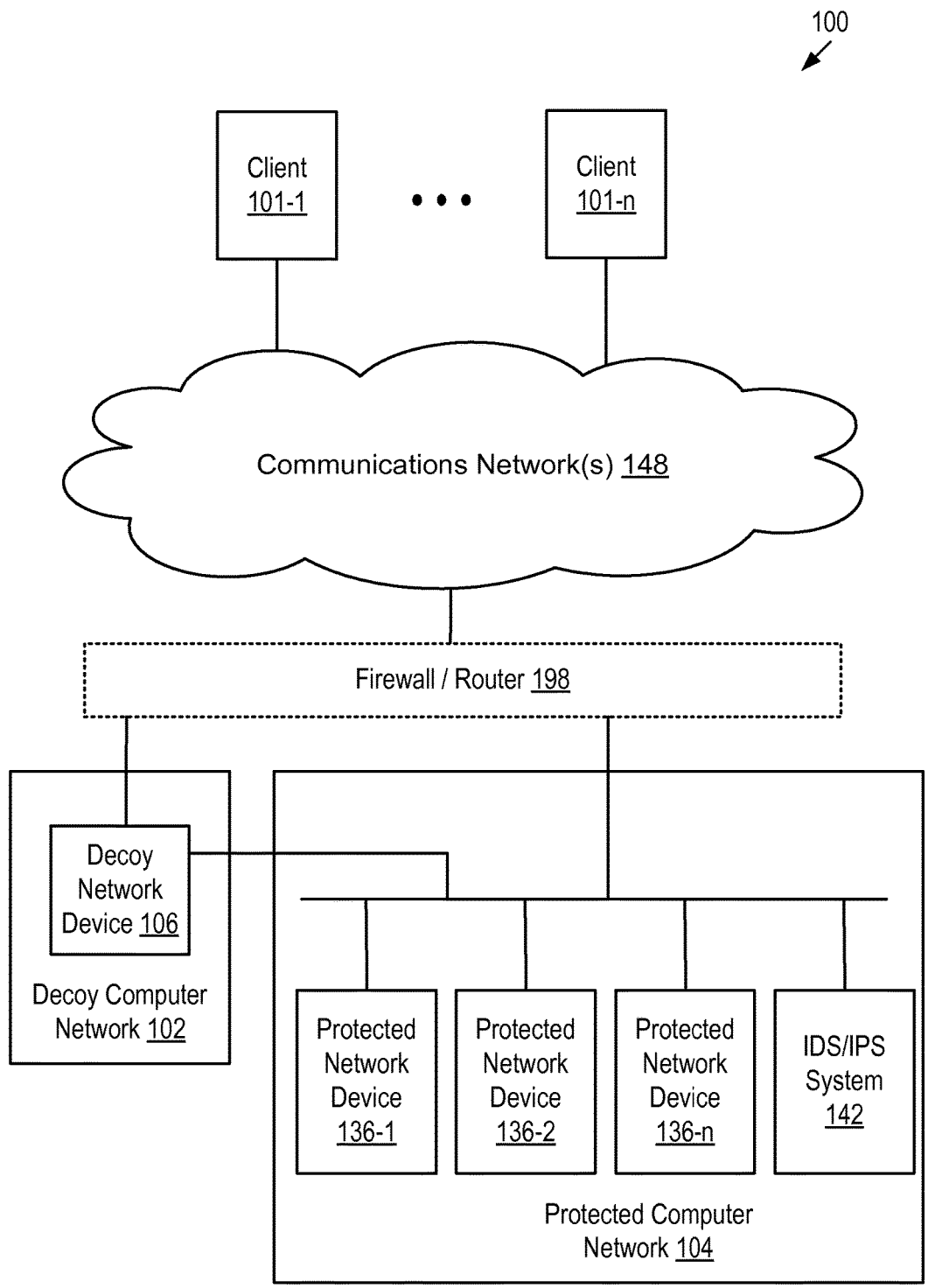
FIG. 1 is a high-level block diagram illustrating an exemplary distributed computer system in accordance with some embodiments.

FIG. 1 illustrates an exemplary distributed computer system 100, according to some embodiments. The system 100 includes a decoy computer network 102, a communications network 148, and protected computer network 104. Various embodiments of the decoy computer network 102 and protected computer network 104 implement the unauthorized activity identifying methods described in this document.

In some embodiments, the systems on the decoy computer network 102 and the protected computer network 104 can be accessed by client computers 101. The client computers 101 can be any of a number of computing devices (e.g., Internet kiosk, personal digital assistant, cell phone, gaming device, desktop computer, laptop computer, handheld computer, or combinations thereof) used to enable the activities described below. The client computer(s) 101 is also referred to herein as client(s). The clients 101 are connected to the decoy network device 106 and the protected network device 136 (e.g., 136-1, 136-2, and 136-n) via the communications network 148.

The protected network devices 136-1 through 136-n are accessible from the network 148 by one or more authorized users using the clients 101 (e.g., the protected network devices can be servers providing services for webpages, emails, file downloading and sharing, web applications, etc.). Typically, the protected computer network 104 includes a firewall/router 198 to protect the protected network devices 136 and route network traffic to and from the protected network devices 136. Alternatively, the firewall/router 198 can protect both the decoy computer network 102 and the protected computer network 104, as illustrated in FIG. 1.

In some embodiments, the protected computer network 104 also includes an IDS/IPS system 142 (intrusion detection and prevention system). The IDS/IPS system 142 includes, or has access to, a fingerprint library. The fingerprint library includes fingerprints of unauthorized activities. The IDS/IPS system 142 identifies unauthorized activities based on the fingerprints stored in the fingerprint library, and provides notification to a user or a system administrator, and/or prevents unauthorized activities matching the stored fingerprints by modifying the protected network devices 136 and/or the firewall/router 198. Suitable IDS/IPS systems 142 include Cisco Systems' IPS 4200 Series, Juniper's IDP 200, and Enterasys' Dragon IDS Network Sensor.

As explained above, in some embodiments, the IDS/IPS system 142 is coupled to the firewall/router 198 such that the IDS/IPS system can reconfigure the firewall/router 198 to protect the protected network devices 136 in the protected computer network 104 from future attacks. In some embodiments, the IDS/IPS and the firewall are located in a single combined device.

The decoy computer network 102 includes one or more decoy network device(s) 106. The decoy network device 106 is a decoy system that is monitored to collect fingerprint data of unauthorized activities. In some embodiments, the decoy network device 106 is intentionally kept vulnerable to unauthorized or malicious activities (e.g., known security weaknesses may be intentionally left unfixed or other security components (e.g., firewalls) are intentionally not installed). In other embodiments, the decoy network device 106 includes security devices and software applications like other protected network devices (e.g., the decoy network device 106 may be protected by the firewall/router 198 and any other security measures included in the protected network devices 136). The purpose of the decoy network device 106 is to allow attackers to attack the decoy network device 106, so that the pattern of the attack can be monitored and analyzed to generate a fingerprint. This fingerprint of the attack can be used to prevent similar attacks on the decoy network device 106 and/or other computers (e.g., protected network devices 136).

Attackers can initiate attacker activities over the communications network(s) 148 on both the decoy computer network 102 and the protected computer network 104. Ideally, the firewall/router 198 or security software on the protected network devices 136 will protect the protected network devices 136 from at least some of the attacker activity(s), whereas the decoy network device 106 is typically exposed to the attacker activity(s) in order to attract the attacks.

Although FIG. 1 illustrates the decoy computer network 102 and the protected computer network 104 as separate networks, in some embodiments, they are part of a same network. For example, in some embodiments, the protected computer network 104 includes the decoy computer network 102. In other embodiments, the decoy computer network 102 and the protected computer network 104 are the same network. Although the methods described herein are described with respect to monitoring the decoy network device 106, persons having ordinary skill in the art would recognize that similar methods may be used for monitoring one or more non-decoy systems, such as the protected network device 136.

Figure 2:
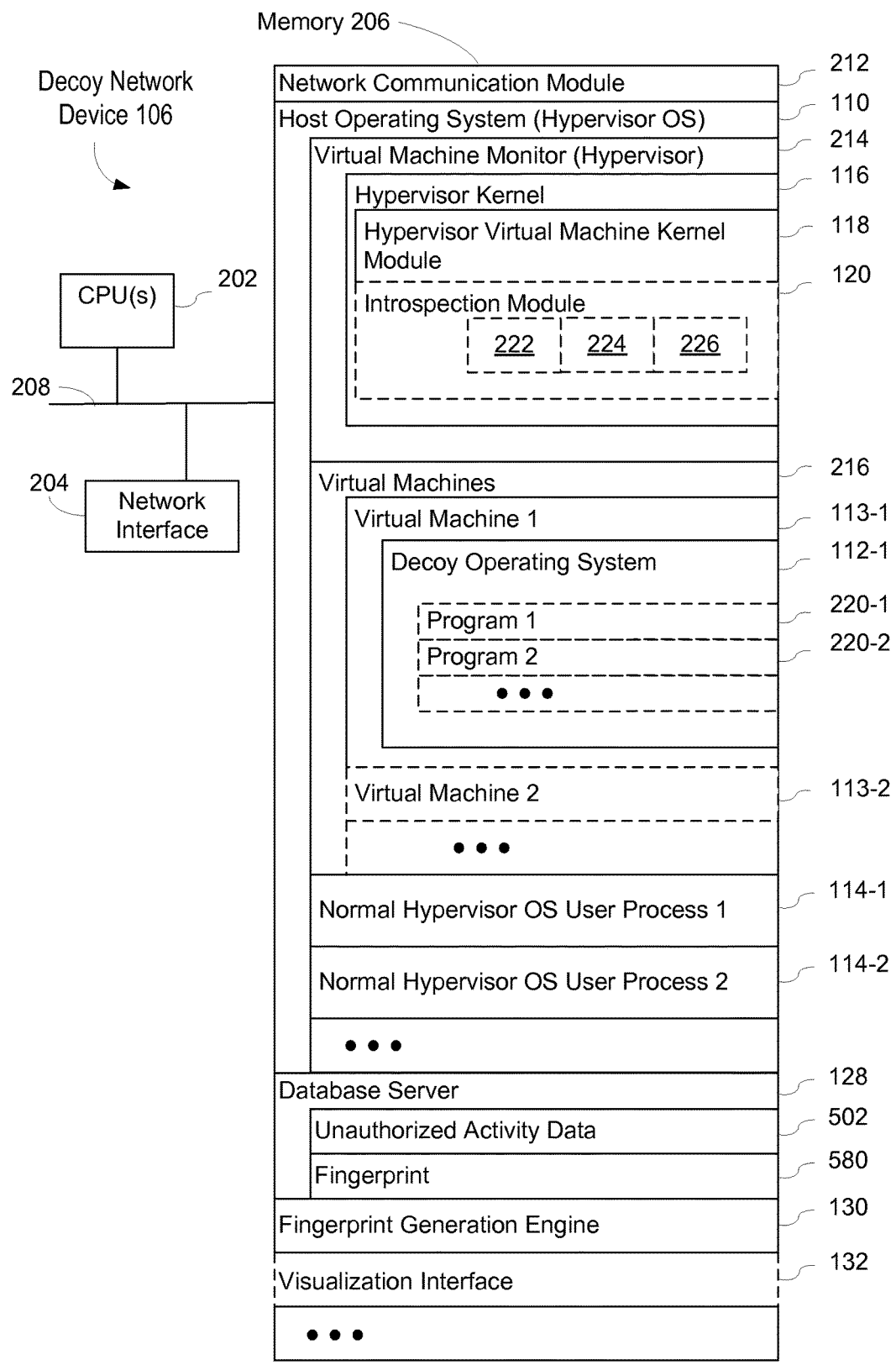
FIG. 2 is a block diagram illustrating a decoy network device, in accordance with some embodiments.

FIG. 2 is a block diagram illustrating the decoy network device 106 in accordance with some embodiments. The decoy network device 106 typically includes one or more processing units (CPUs) 202, one or more network or other communications interfaces 204, memory 206, and one or more communication buses 208 for interconnecting these components. In some embodiments, the communication buses 208 include circuitry (sometimes called a chipset) that interconnects and controls communications between system components. In some other embodiments, the decoy network device 106 includes a user interface (not shown) (e.g., a user interface having a display device, a keyboard, and a mouse or other pointing device), but when implemented as a server, the decoy network device 106 is more typically controlled from and accessed by various client systems (e.g., the client 101 in FIG. 1; and more typically, a client connected through a secure private network).

The memory 206 of the decoy network device 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a computer readable storage medium. The memory 206 or the computer readable storage medium of the memory 206 stores one or more of the following programs:

the network communication module (or instructions) 212 that is used for connecting the decoy network device 106 to computer networks (e.g., communication network(s) 148, decoy computer network 102, and protected computer network 104), and/or other computers (e.g., the client 101) via the one or more communications interfaces 204 and one or more communications networks 148, such as the Internet, a wireless network (e.g., Wi-Fi, WiMAX, 3G, 4G, etc.), any local area network (LAN), wide area network (WAN), metropolitan area network, or a combination of such networks;

the host operating system 110 (also called Hypervisor OS) that includes procedures for handling various basic system services and for performing hardware dependent tasks;

database server 128, which stores data (e.g., unauthorized activity data 502 and/or fingerprint 580);

fingerprint generation engine 130, which generates the fingerprint data 580 from the unauthorized activity data 502); and visualization interface 132, which prepares data (e.g., the fingerprint or unauthorized activities on the computer system) for display (e.g., on a GUI of a client 101).

The fingerprint 580, as described below with reference to FIGS. 5B and 5C, include data indicative of unauthorized activities on the decoy network device 106. Such fingerprint 580 can be used (e.g., by the IDS/IPS system 142) to detect and prevent unauthorized activities on protected network devices 136.

In some embodiments, the host operating system (e.g., the host OS 110) includes one or more of the following:

a virtual machine monitor 214 (also called a hypervisor);

virtual machines 216, including virtual machine 1 (113-1) and (optional) virtual machine 2 (113-2); and normal hypervisor OS user processes (e.g., 114-1 and 114-2), such as administrative utilities, network tools (e.g., netcat and ifconfig), shell processes (e.g., ssh and bash), package management utilities (e.g., dpg and apt), drivers, filesystem utilities, and programming environments (e.g., python and lua).

The virtual machine monitor 214 includes a hypervisor kernel 116 that resides in physical memory and provides the basic services to the virtual machine monitor 214. In some embodiments, the hypervisor kernel 116 is a part of the hypervisor operating system 110 (e.g., a kernel of the hypervisor operating system 110). In such embodiments, the hypervisor kernel 116 is a part of the operating system that activates the hardware directly or interfaces with another software layer that, in turn, drives the hardware.

The hypervisor kernel 116 includes a hypervisor virtual machine kernel module 118 that supports virtualization of a "guest" decoy operating system 112. The hypervisor kernel 116 also includes an introspection module 120 interposed between the virtual machine monitor 214 and decoy operating system(s) 112. The introspection module 120 performs introspection (e.g., monitoring) into the physical memory segments assigned to each of the virtualized decoy operating system 112.

Because no software is installed in the virtualized decoy operating system 112, it is more difficult for the virtualized decoy operating system 112 (or an attacker who has gained access to the virtualized decoy operating system 112) to detect that its memory is being monitored.

The introspection module is configured to examine the memory assigned to virtualized decoy operating systems 112 in order to acquire low-level data about the interaction between the decoy operating systems 112 and attack activity. The introspection module examines the memory of virtualized decoy operating systems 112 by means of three functional components: a code region selector 222, a trace instrumentor 224, and a trace analyzer 226. Regular expressions (also known as 'regex') are used throughout the process to identify, describe, and profile the contents of the memory segments of the virtualized decoy operating systems 112. The code selector 222 identifies regions of code in memory that are of interest for further introspection. Regions of interest may include, but are not limited to, system calls, the arguments of system calls, the returns of system calls, device and memory input-output, driver information, library calls, branching information, instruction pointer jumps, and raw network information. The instrumentor 224 copies the memory traces of interest identified by the code selector and then profiles them. The trace analyzer 226 takes the profiled traces and uses them to build a simulation of the states in the virtualized decoy operating system 112 over time. In this manner, the introspection module examines the contents of the memory segments of the virtualized decoy operating systems 112 in an instrumented context that generates and retrieves forensic data (or fingerprint). In some embodiments, the trace analyzer 226 is located outside the introspection module 120 (e.g., in the fingerprint generation engine 130).

In some embodiments, the trace instrumentor 224 is configured to perform operations in accordance with one or more user-defined conditions. The one or more user-defined conditions may specify when one or more memory traces should be generated. Respective user-defined conditions may be rule-based or pattern-based, and may be based on system states or independent of system states. In some embodiments, the trace analyzer 226 is configured to perform operations in accordance with one or more user-defined conditions. The one or more user-defined conditions may specify what portions of the profiled traces to analyze. This allows the user to easily find traces of interest, without having to go through the entire set of traces.

In some embodiments, the introspection module 120 is configured to pause the execution of the virtualized decoy operating system 112, copy the content of memory at prescribed locations, and return execution control to the virtualized decoy operating system 112. In some embodiments, the introspection module 120 pauses the execution of the virtualized decoy operating system 112 for preventing malicious or undesired execution from occurring in the virtualized decoy operating system 112.

An attacker may be able to detect that the decoy operating system 112 is a virtualized operating system, based on the time it takes to perform standardized tasks. However, since the introspection module 120 runs completely outside the virtualized decoy operating system 112, it is difficult for an attacker accessing the decoy operating system 112 to determine whether the decoy operating system 112 is being monitored. In other words, the attacker may suspect that the virtual machine monitor 214 exists, but the attacker may not determine whether the virtual machine monitor 214 includes the introspection module 120. As explained above, the introspection module 120 monitors and introspects into the memory segments of the virtualized decoy operating systems 112. The introspection module 120 introspects and gathers information on any virtualized operating system supported by the hypervisor operating system 110.

The virtual machines 216 are one or more software applications emulating one or more physical machines (e.g., computer systems). In some embodiments, at least one virtual machine (e.g., the virtual machine 1 (113-1)) includes a decoy operating system 112-1, which in turn optionally includes one or more programs (e.g., 220-1 and 220-2). The virtualized decoy operating systems 112 access the physical memory assigned to them by the virtual machine monitor 214 (or the hypervisor kernel 116).

These virtualized operating systems 112 act as decoy operating systems to attract attacker activity. For example, the decoy operating system 112 can be one of WINDOWS, SUN MICROSYSTEMS, SOLARIS, or any version of LINUX known to persons skilled in the art, as well as any combination of the aforementioned. The decoy network device 106 may include any number of virtualized decoy operating systems 112 or any number of virtual machines 113.

Each of the above identified modules, components, and applications in FIG. 2 corresponds to a set of instructions for performing one or more functions described herein. These modules (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, the fingerprint generation engine 130 and the virtualized decoy OS 112 are part of or stored within the decoy network device 106. In other embodiments, the fingerprint generation engine 130 and the virtualized decoy OS 112 are implemented using separate computer systems. In some embodiments, the fingerprint generation engine 130 includes the database server 128. In some embodiments, the database server 128 is a remote database server located outside the decoy network device 106.

The actual number of servers used to implement the decoy network device 106 and how features are allocated among them will vary from one implementation to another, and may depend in part on the amount of data traffic that the system must handle during peak usage periods as well as during average usage periods, and may also depend on the amount of data processed by the decoy network device 106. Moreover, one or more of the blocks in FIGS. 1 and 2 may be implemented on one or more servers designed to provide the described functionality. For example, the decoy network device 106 may be implemented on two distinct computing devices: a monitor device and an analyzer device. The monitor device includes the virtual machine monitor 214, the virtual machines 216, and processes and modules therein. The analyzer device includes the database server 128, the fingerprint generation engine 130, and optionally the visualization interface 132. In such configuration, the monitor device collects unauthorized activity data, and the analyzer device analyzes the unauthorized activity data to generate fingerprints.

When in use, attackers typically search for vulnerable computers connected to the shared communication network(s), and attempt to perform unauthorized activities on such vulnerable computers through the shared communication network(s).

Attacker activity may be directed at the decoy computer network 102 through one or more ports of each of the virtualized decoy operating system 112 that are left open as a gateway for the attacker activity. For example, the decoy network 102 can be configured to respond to connection attempts made at network addresses that do not exist on the protected network 104 (e.g., through a connection from the firewall/router 198 to the decoy network device 106 as illustrated in FIG. 1). Connections to these non-existent network addresses are assumed to be unauthorized and routed to one of the decoy operating systems 112, since no production hardware (e.g., protected network device 136) exists on the protected network 104 at these addresses. In particular, the decoy operating systems 112 are not configured to provide any user service, and therefore, no ordinary (i.e., authorized and/or non-malicious) user would attempt to access to the virtual machine.

The decoy operating systems 112 (in the form of a virtualized operating system) may be configured to respond to any such non-existent network address. In a typical attack, the attacker activity scans for an open port, ostensibly in an attempt to make a network connection and then access one or more computing devices on the protected computer network 104. When the attacker activity scans for open ports at non-existent network addresses, however, the attacker is presented with a virtualized decoy operating system 112 instead.

When the attacker connects to a virtualized decoy operating system 112 through an open port, the attacker sees a fully-functional standard operating system fingerprint. Since the decoy network device 106 can be configured to present any operating system as a fully-functional virtualized decoy operating system 112, responses to connection requests from attacker activity are guaranteed to be authentic for the operating system running on that decoy. For example, an FTP port access request for WINDOWS may return a specific character sequence that differs from an FTP response for LINUX. Similarly, an FTP access request to a WINDOWS port may return a response ">ftp: connect: Connection refused." This character sequence may be slightly different from that generated by LINUX. Further, different versions of WINDOWS may respond with slightly different, version-specific character sequences. Since attackers often use these sequences to identify what type of operating system is at a particular network address and the version (or range of possible versions) for that operating system, the fact that virtualized decoy operating systems 112 generate authentic responses makes them realistic decoys and encourages intruders to attempt unauthorized access to them. The instigator of the attack is thus lured into accessing the decoy 112, which is overseen by the hypervisor operating system 110 running on the hardware-based, decoy network device 106. Attacker activity may then initiate previously unknown attacks for the observed operating system. When the attacker activity proceeds to interact with the decoy operating system 112, the attacker provides the decoy operating system 112 with the data used to obtain control of the decoy operating system 112. These data are recorded and analyzed by the introspection module without the knowledge of the attacker.

All scans by the attacker activity receive real-world operating system and service information, leading the instigator of the attack activity to believe that there is a potentially vulnerable system responding. The attacker is thus lured into communicating with the decoy network device 106 and its virtualized decoy operating systems 112 and services. Since the decoy network device 106 includes real hardware, the attacker is essentially attacking an actual physical system and, therefore, cannot tell that the system is actually an instrumented honeypot that monitors the attacker activity from the introspection module. When an attacker connects to a network port and begins interacting with a virtualized decoy operating system 112, the introspection module monitors and captures information from the connection, including port numbers, data streams, file uploads, keystrokes, ASCII or binary files, malicious payloads, memory manipulation attempts, and any other data transfers or malicious attempts.

In some embodiments, the introspection module monitors all activity (e.g., system calls, library calls, kernel calls, etc.) on virtualized decoy operating systems 112. In other embodiments, the introspection module, instead of monitoring all activity on virtualized decoy operating systems 112, monitors activity on virtualized decoy operating system 112 based on a monitoring priority (e.g., key system calls and kernel calls). The monitoring priority may be set based on the type of unauthorized activities. For example, in some embodiments, incoming network packets are given high priorities, and therefore, the incoming network packets are thoroughly monitored and analyzed. In some other embodiments, system calls are given high priorities. In yet other embodiments, a virtualized decoy operating system (e.g., 112-1) on a virtual machine 1 (e.g., 113-1) is given a high priority than other virtualized decoy operating system, when the virtual machine 1 is experiencing a high frequency of unauthorized activities. Also a combination of the factors stated above can be used to determine the monitoring priority. In some embodiments, the monitoring priority is user-configurable.

In use, the introspection module captures (through the introspection) raw attack information. The raw attack information is then communicated to and stored on the database server 128 as forensic data 236 for later analysis. The fingerprint generation engine 130 or the trace analyzer 226 then uses this raw forensic information 236 to generate a signature of the attack. In some embodiments, the fingerprint generation engine 130 or the trace analyzer 226 uses the raw attack information to generate a signature of the attack without storing the raw attack information (i.e., unauthorized activity data) in a database server (e.g., database server 128) first. In some embodiments, the fingerprint generation engine 130 or the trace analyzer 226 uses the raw attack information to generate a signature of the attack without storing the raw attack information in persistent data storage (e.g., database server 128) at all. It should be appreciated that although the signature of the attack may be used to generate an attack signature suitable for use in security applications (e.g., IPS, AV, etc.), the signature of the attack is distinct from the attack signature. The signature (also called a fingerprint) may be used for providing detailed forensic analysis of the character and nature of the attack and its impact on the target operating system, which can be used as the basis for generating triggers. Such triggers may be used to deny malicious system or library calls on the decoy operating system 112.

In some embodiments, the entire process from attack detection through fingerprint generation occurs automatically, i.e., without any human intervention, at a timescale ranging from nearly immediate to several minutes. The IDS/IPS system 142 uses the attack signature to identify and prevent subsequent attacks.

In one or more embodiments, the signature may be sent from the fingerprint generation engine 130 to the intrusion detection and/or prevention (IDS/IPS) signature library 134 through a second network connection 140, which is used by the fingerprint generation engine 130 to directly interact with the IDS/IPS system 142.

After collecting unauthorized activity data, the introspection module 120 may easily clean the virtualized decoy operating system 112 at any time by removing the running system image of the compromised virtualized decoy operating system and replacing it with a pre-attack system image. Thus the introspection module 120 can cleanse or reset the virtualized decoy operating system 112 of any malicious software or payload, removing the possibility that attacker(s) can use that virtualized decoy operating system 112 for further attacks on other networks. In this manner, the attack can be thwarted, and the operating system does not become a tool of the attacker(s). This procedure may also be automated, i.e., may occur without further human intervention.

FIGS. 3A-3D and 4A-4E illustrate exemplary network diagrams representing unauthorized activity on a computer system (e.g., the virtual machine 113-1), in accordance with various embodiments. Although FIGS. 3A-3D and 4A-4E illustrate unauthorized activities on the virtual machine 113-1, analogous methods can be used to represent and analyze unauthorized activities on non-virtualized computer systems.

Figure 3A:
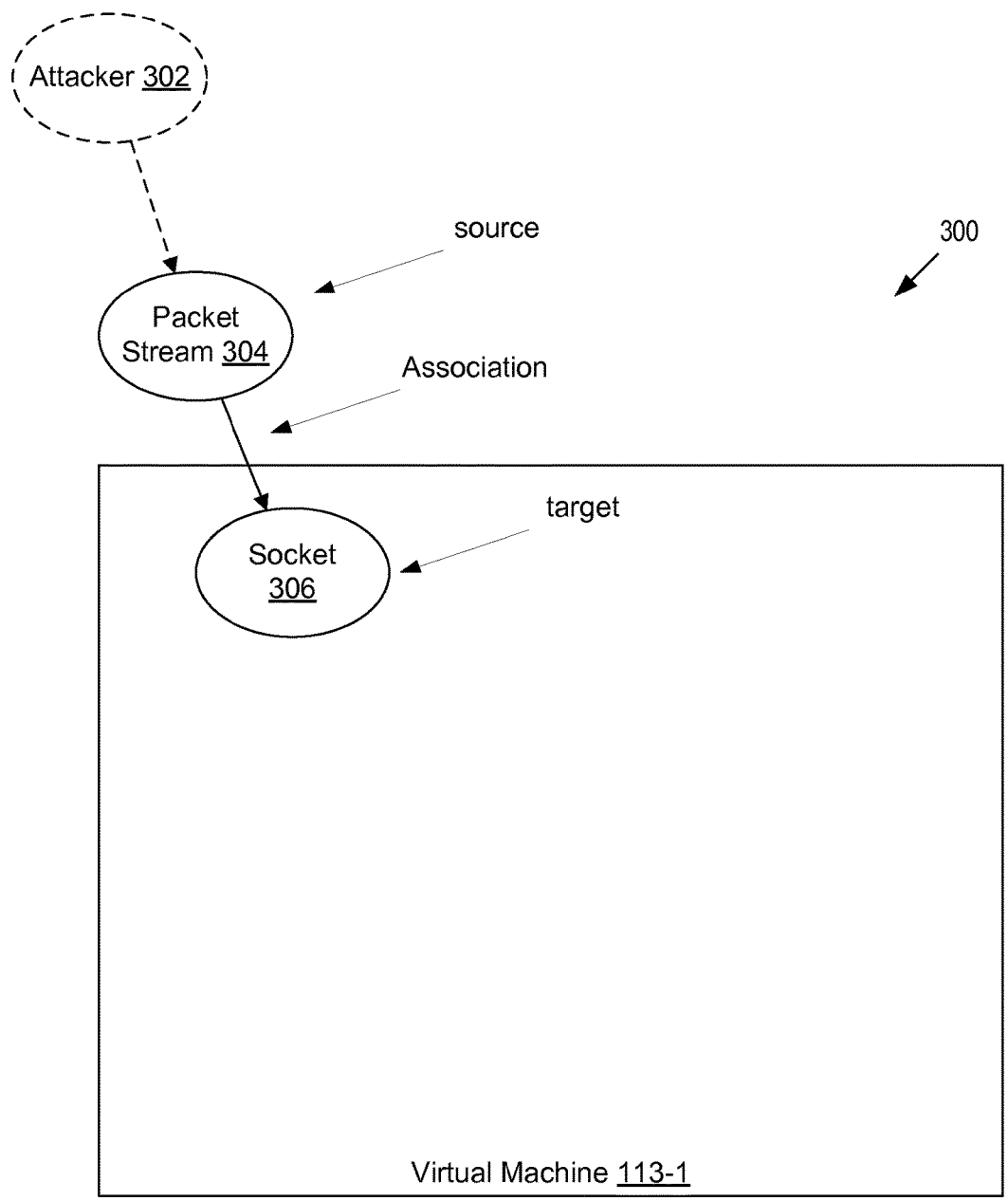
FIGS. 3A-3D are exemplary network diagrams illustrating unauthorized activities on a network socket, in accordance with some embodiments.

FIG. 3A-3D illustrate exemplary network diagrams 300 representing unauthorized activities on a network socket (e.g., the virtual machine 113-1), in accordance with some embodiments. In FIG. 3A, a data packet stream 304 at a socket 306 of the virtual machine 113-1 is detected by the virtual machine 113-1 and monitored by the virtual machine monitor 214. When the virtual machine 113-1 is a decoy system, the virtual machine 113-1 typically does not actively send and receive packet streams over the network (because the purpose of the decoy system is to wait for a potential attack from an attacker), and any incoming packet stream 304 of data is treated as an unauthorized activity (e.g., an attempt by a hacker to probe a security system of the virtual machine 113-1). In some embodiments, any request to access a computer that does not exist on the protected computer network is treated as an unauthorized activity, and such request is routed to one of the decoy systems (e.g., a virtual machine 113-1 on the decoy network device 106), which is monitored for additional unauthorized activities. In some embodiments, an attacker 302 who sends the packet stream 304 to the socket 306 is identified (e.g., by the Internet Protocol (IP) address).

Figure 3B:
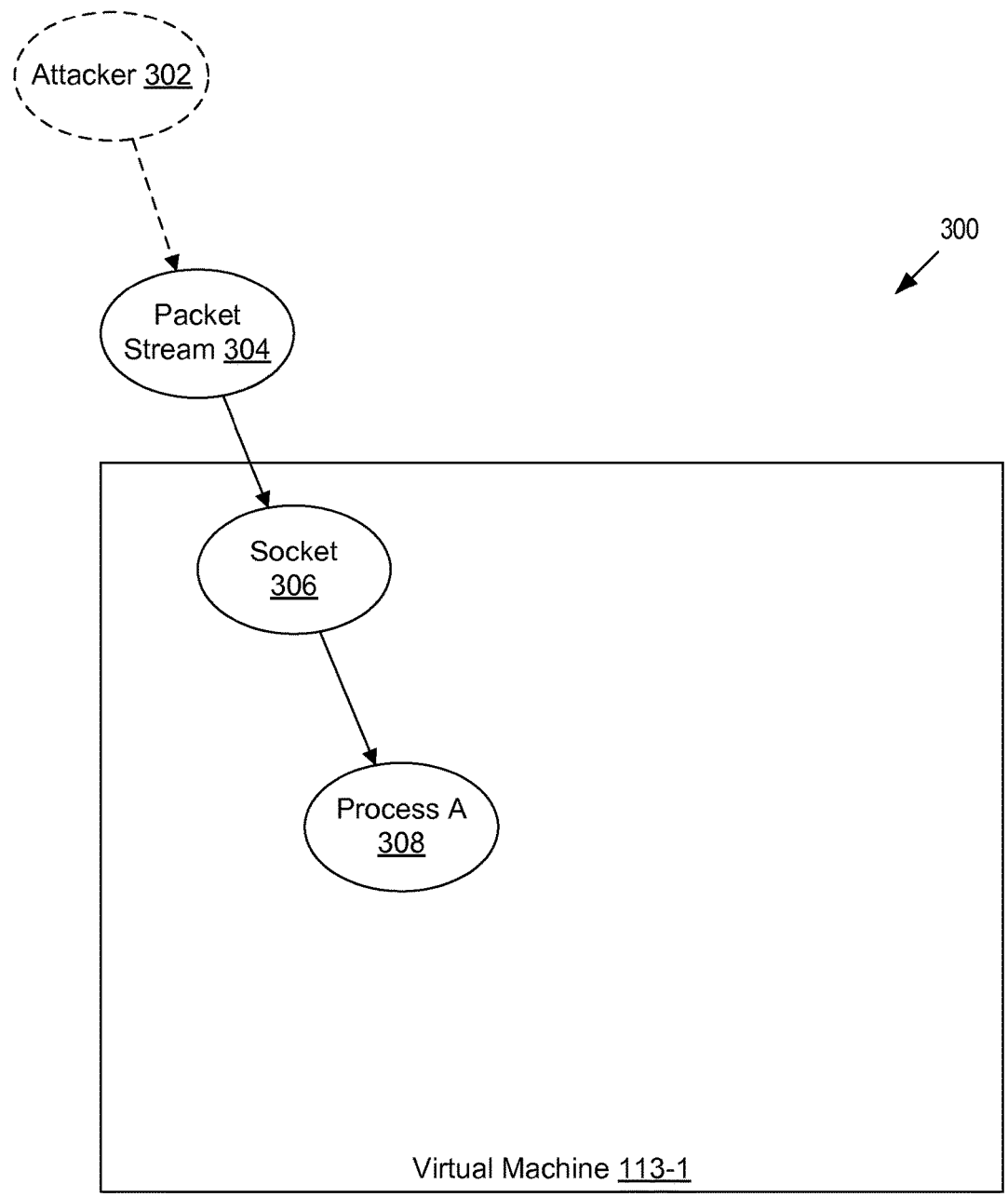

Once the packet stream 304 and the socket 306 are identified as affected by unauthorized activities, related unauthorized activities are identified. FIG. 3B shows that the packet stream 304 received by the socket 306 is directed to a process A 308, and the process A 308 is treated as affected by unauthorized activities. In turn, in FIG. 3C, the process A 308 accesses a file X 310 and a file Y 312, and both the file X 310 and the file Y 312 are treated as affected by unauthorized activities. Thereafter, the file X 310 initiates a process B 314, and the process B is treated as affected by unauthorized activities.

By analyzing these activities, the fingerprint of the unauthorized activities can be identified (e.g., the unauthorized activities start with the packet stream 304; the unauthorized activities send the packet stream 304 into the computer system 398 through the socket 306; the packet stream 304 is directed to the process A 308; etc.). By using this information, the security of the protected network devices 136 can be improved (e.g., the socket 306 can be closed; the process A 308 can be modified to not respond to data similar to the packet stream 304; etc.).

Figure 4A:
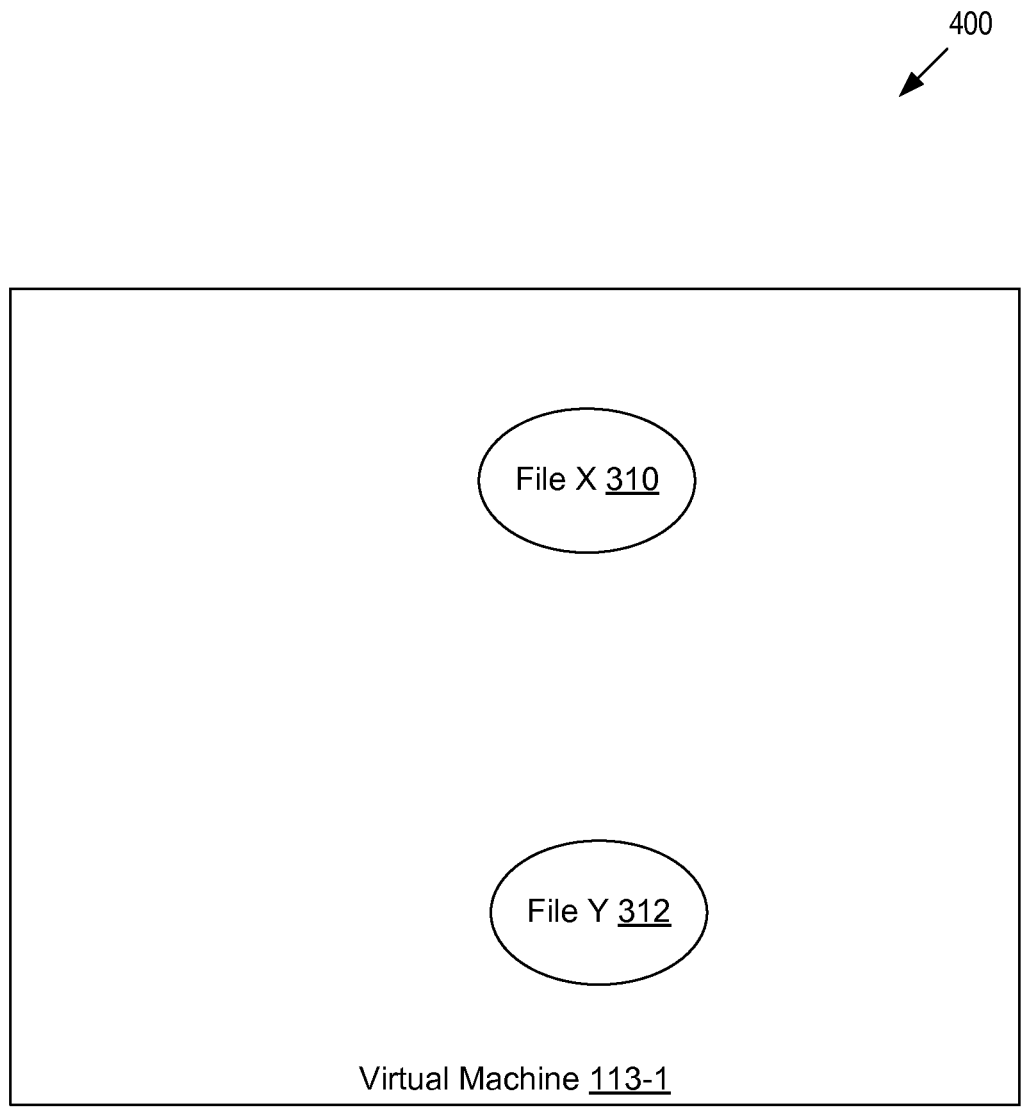
FIGS. 4A-4D are exemplary network diagrams illustrating unauthorized activities on files in a computer system, in accordance with some embodiments.

FIGS. 4A-4D illustrate exemplary network diagrams 400 representing unauthorized activities on files in a computer system (e.g., the virtual machine 113-1), in accordance with some embodiments. In FIG. 4A, unauthorized activities on the file X 310 and the file Y 312 in the virtual machine 113-1 are detected. For example, the unauthorized activity may be detected by using checksum values of the file X 310 and the file Y 312 (e.g., a different checksum value can indicate that a corresponding file has been modified by an unauthorized process). Alternatively, the unauthorized activity may be detected by monitoring data execution prevention (DEP) exceptions associated with the file X 310 and the file Y 312, generated by the one or more processors (e.g., 202 in FIG. 2); or by a manual selection from a system administrator (e.g., based on a file corruption or an erratic behavior).

Figure 4B:
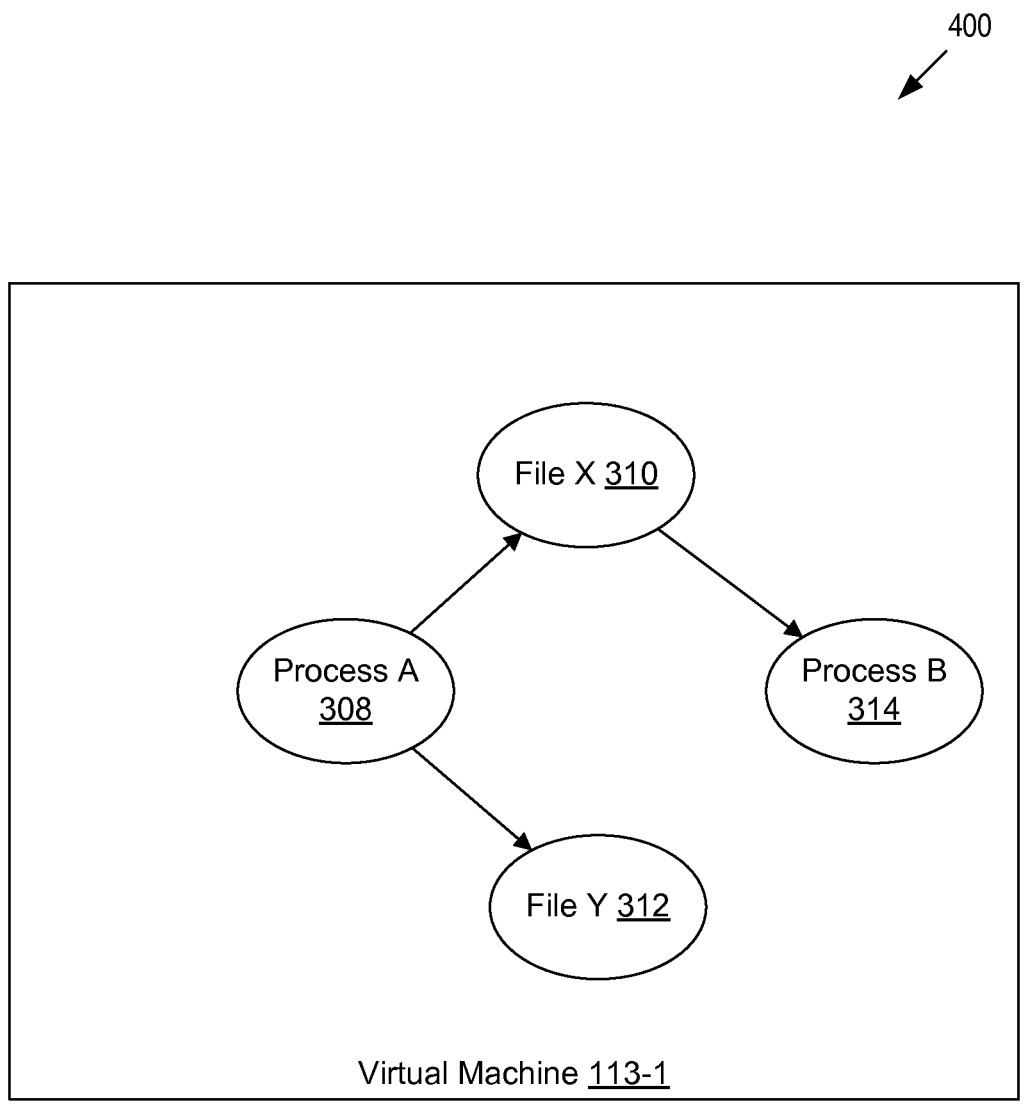

FIG. 4B shows that the process A 308 accesses both the file X 310 and the file Y 312, and the process A 308 is treated as affected by unauthorized activities. Also in FIG. 4B, the file X 310 initiates the process B 314, and the process B is treated as affected by unauthorized activities.

Figure 4C:
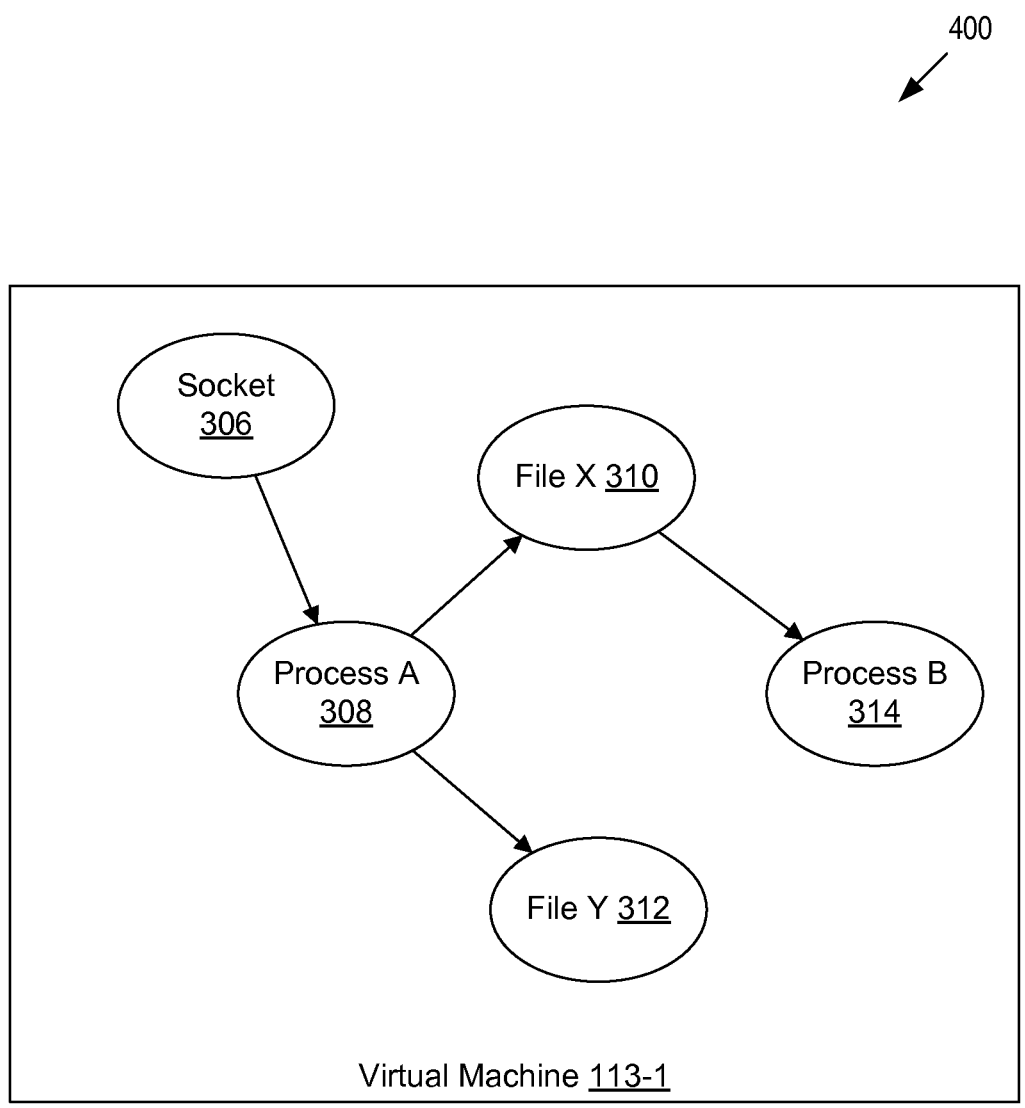
Figure 4D:
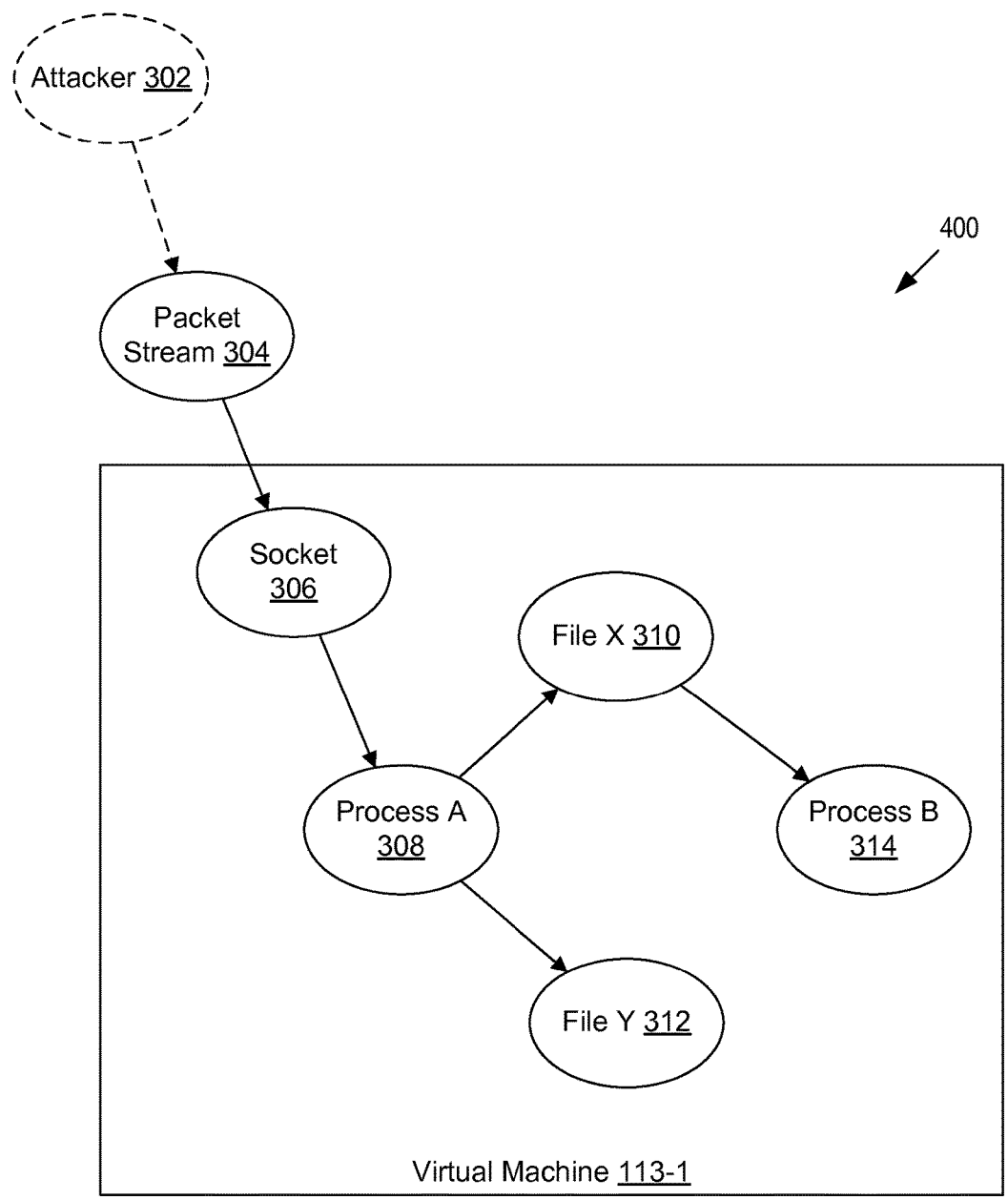

In FIG. 4C, data from the socket 306 is directed to the process A 308, and the socket 306 is treated as affected by unauthorized activities. FIG. 4D shows that the socket 306 receives the packet stream 304, and the packet stream 304 is treated as affected by unauthorized activities. In some embodiments, the attacker 302 who sends the packet stream 304 to the socket 306 is identified (e.g., by the IP address).

Figure 4E:
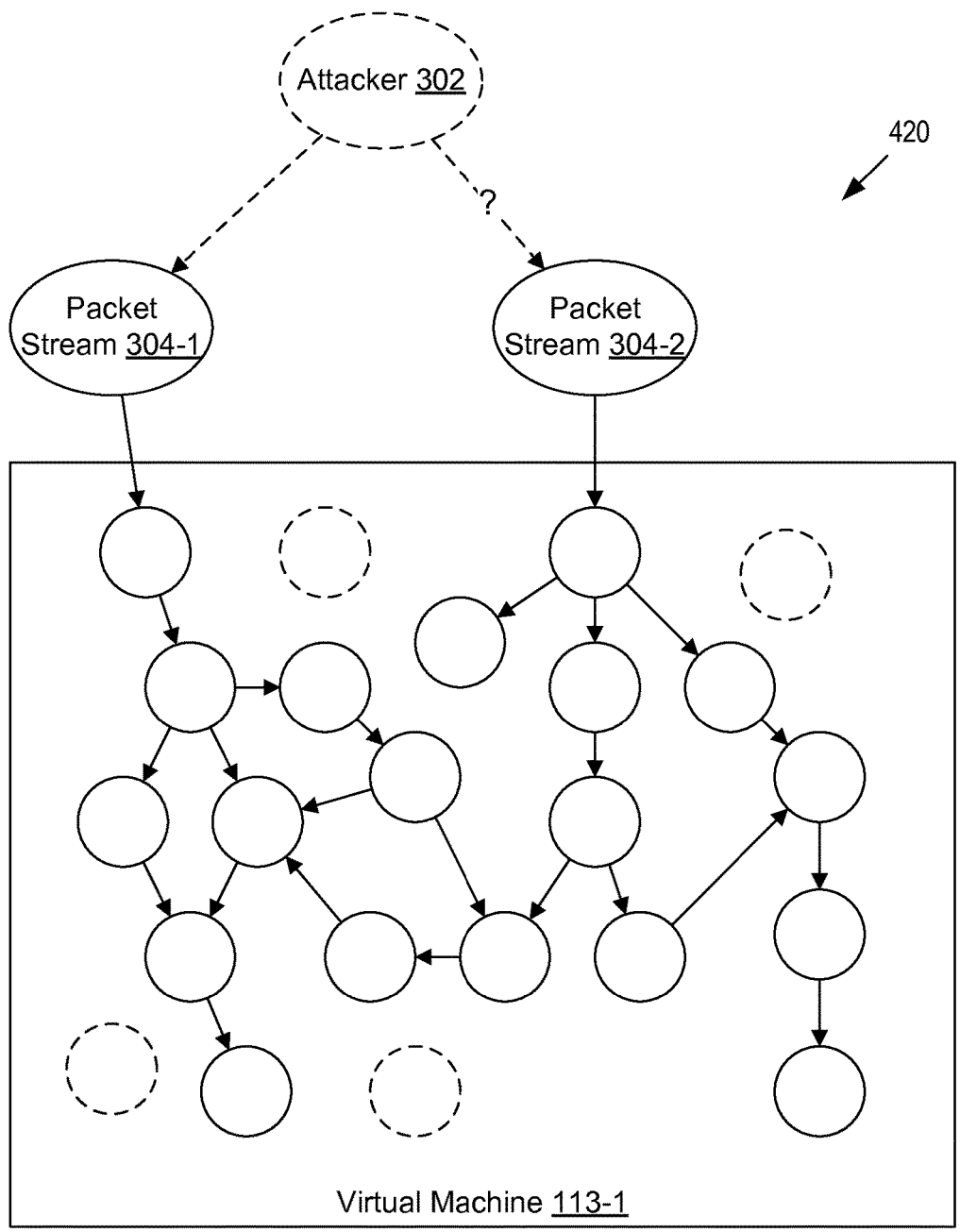
FIG. 4E is an exemplary network diagram illustrating unauthorized activities on a computer system, in accordance with some embodiments.

FIG. 4E illustrates an exemplary network diagram 420 representing unauthorized activities on a computer system (e.g., the virtual machine 113-1), in accordance with some embodiments. In FIG. 4E, multiple packets of data streams (e.g., 304-1 and 304-2) are detected, and all activity on the computer system 498 are monitored and recorded. When the type of associations is identified (e.g., malignant, benign, etc., as described in more detail below with reference to a type 516 in FIG. 5A), at least a subset of the associations can be visually distinguished (e.g., a respective bold arrow representing a malignant association; a regular arrow representing a benign association; alternatively, any other graphical scheme can be used to visually distinguish the subset of the associations, such as color, font, shape, icons, etc.). It is also noted that certain objects drawn with dashed lines (e.g., files, processes, etc.) may have been identified as affected by unauthorized activities, but their associations with other objects may not have been identified.

Figure 5A:
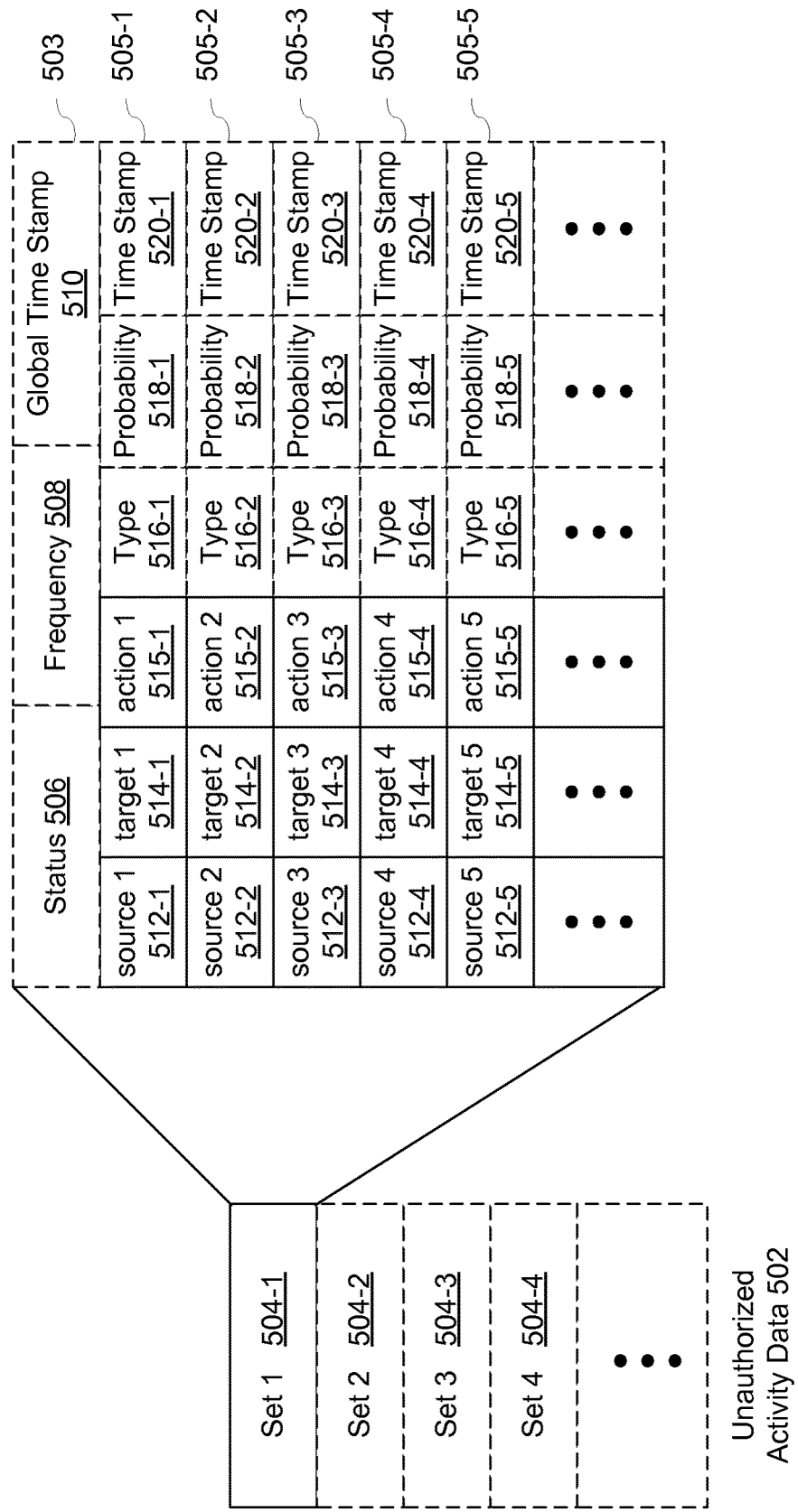
FIG. 5A illustrates an exemplary data structure of unauthorized activity data, in accordance with some embodiments.

FIG. 5A is a block diagram illustrating exemplary data structures of unauthorized activity data 502 and unauthorized activity entries 505 in the unauthorized activity data 502, in accordance with some embodiments. Unauthorized activity data 502 includes unauthorized activity entries 505. In some embodiments, the unauthorized activity entries are grouped into one or more sets (e.g., 504) based on time (e.g., time when the entries are recorded or time window of recorded activity), association types (e.g., malicious associations v. benign associations), source types, target types, and other characteristics of the unauthorized activities.

The unauthorized activity data 502 shown in FIG. 5A is grouped based on time (e.g., when the entries are recorded). Each set optionally includes one or more of the following set variables 503:

status 506, which indicates whether the unauthorized activity data 502 is complete or incomplete; the set (e.g., 504-1) is determined to be complete if associations for all objects (e.g., activity sources and activity targets) affected by unauthorized activities are identified; the set (e.g., 504-1) is determined to be incomplete if an association for any object affected by unauthorized activities is not identified;

frequency 508, which indicates a number of unauthorized activities on the computer system (e.g., virtual machine 113) during a predefined time interval (e.g., one second, five seconds, one minute, five minutes, one hour, five hours, one day, two days, etc.); in some embodiments, the frequency 508 is a relative frequency measured by a number of computer processes affected by unauthorized activities and a total number of computer processes running on the computer system; for example, if the computer system (e.g., virtual machine 113) runs fifty total processes including ten processes affected by unauthorized activities, the frequency 508 is 20% (=10/50); and a global time stamp 510, which represents the time when the data in the set (e.g., 504-1) was collected.

Each set 504 in the unauthorized activity data 502 in FIG. 5A also includes one or more unauthorized activity entries 505 (e.g., 505-1, 505-2, 505-3, 505-4, and 505-5). Each unauthorized activity entry 505 includes one or more of the following:

an activity source 512, which calls, accesses, or executes the activity target 514; the activity source 512 may be one of the following: access to a particular file, access from a particular user, an Internet Protocol address, an instruction, a message, data stream, a hardware component, and a network port; for example, when an instruction A accesses a file X, the instruction A is the activity source, and the file X is the activity target 514;

an activity target 514, which is called, accessed, or executed by the activity source 512. The activity target 514 may be one of the following: a file, an Internet Protocol address, an instruction, a message, data stream, a hardware component, and a network port; and an action 515, which represents an event or operation occurring between the activity source 512 and the activity target 514. The action 515 is typically one of: calling, executing, modifying, or accessing operation, such as system calls and library calls.

An (optional) association type 516, which when identified, represents the type of association between the activity source 512 and the activity target 514; the association type may be one of the following:

malignant, which represents that the activity source 512 has modified the activity target 514 to perform unauthorized activities;

benign, which represents that the activity source 512 has interacted with the activity target 514 but has not modified the activity target 514 to perform unauthorized activities (e.g., the instruction A reads the file X, but does not modify the file X); and remission, which represents that the activity source 512 is determined to be no longer active in propagating unauthorized activity; for example, the activity source 514 may be modified to remove malicious data and/or to stop unauthorized activities (e.g., by the IDS/IPS system 142);

(optional) probability 518, which when identified, represents a probability that the corresponding association is malignant; and (optional) time stamp 520, which when identified, represents the time when the activity source 512 associates with the activity target 514 (e.g., when the activity source 512 calls, accesses, or executes the activity target 514).

Figure 5B:
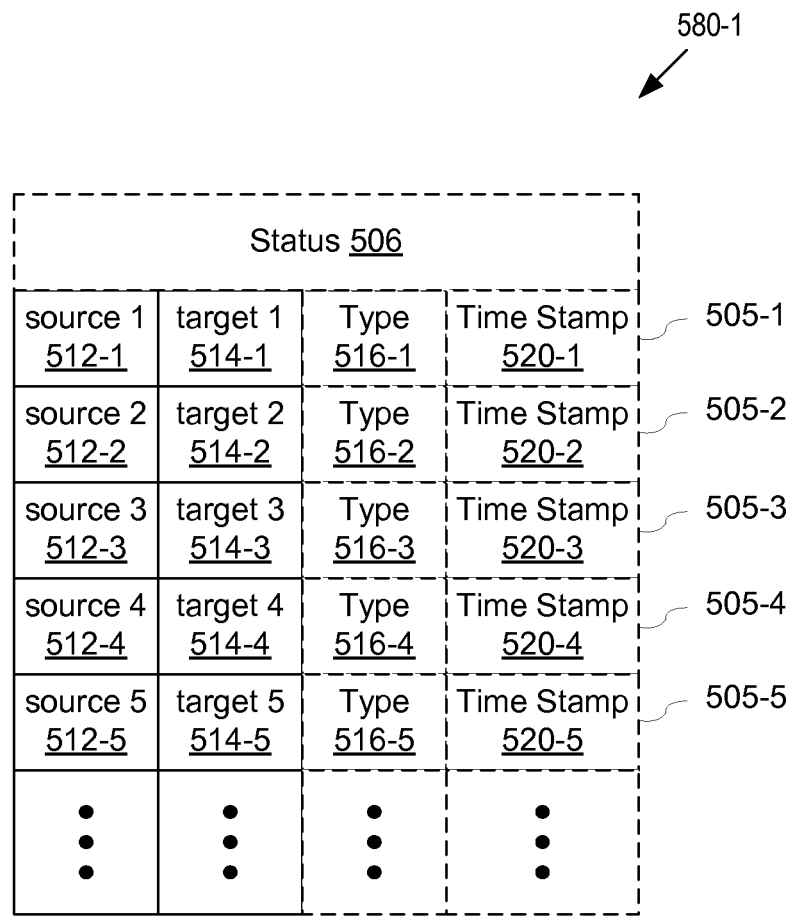
FIG. 5B illustrates an exemplary data structure of fingerprint, in accordance with some embodiments.

FIG. 5B illustrates an exemplary data structure of fingerprint 580, in accordance with some embodiments. In FIG. 5B, the fingerprint 580-1 includes one or more of the following: an (optional) status 506, an activity source 512, an activity target 514, an (optional) association type 516, and an (optional) time stamp 520, all of which are described above.

The fingerprint 580-1 can be used to prevent future attacks on the computer system or other computer systems, by modifying the activity targets 514 (e.g., increasing privileges, changing the file/instruction name, changing the file/instruction structure, moving the file/instruction to a different location, blocking a particular port, encrypting the file, etc.) to protect the activity targets 514 or blocking the same or similar (e.g., at least partially matching) pattern or sequence of activities (e.g., if the fingerprint of the unauthorized activities starts with sending packets A, B, and C in order, blocking the receipt of the packet C after receiving the packets A and B).

In some embodiments, the fingerprint 580 consists of respective pairs of activity sources and activity targets, when the association type for a respective pair is malignant. This reduces the size of the fingerprint 580.

FIG. 5C illustrates another exemplary data structure of fingerprint 580, in accordance with some embodiments. In FIG. 5C, the fingerprint 580-2 includes the following, or a subset or superset thereof:

(one or more) activity sources 512, as described above;

a reference value 522, which is used to identify a particular activity source 512; for example, the reference value 522 can be a file size, a checksum value, one or more portions of the file, instruction, or data packet;

an (optional) method 524, which is used to indicate how the reference value 522 is used to identify a corresponding activity source 512, or how the activity source is processed to obtain a measured value which can be compared with the reference value 522 to identify the activity source 512. For example, the method can be "checksum," which requires determining a checksum value of the activity source 512, or "match," which requires matching the reference value with the activity source 512. The method 524 is typically omitted when a default method is used to identify the source 512.

The fingerprint 580-2 can be used to prevent future attacks on the computer system or other computer systems, by blocking activity sources that match a pattern of unauthorized activities (e.g., the reference value 522). For example, if the fingerprint of the activity source includes a data stream with a repeated character of a predefined length (e.g., a 2 KB long string of a repeated character), the IDS/IPS can block such data stream by using the reference value 522.

In some embodiments, the fingerprint 580-2 includes activity targets 514 in lieu of, or in addition to, the activity sources 512.

In some embodiments, the fingerprint 580 includes one or more of: system calls, arguments of system calls, returns of system calls, device and memory input-output, driver information, library calls, branching information, instruction pointer jumps, and raw network information collected from a respective virtual machine 113 or a respective decoy operating system 112 (not shown).

Figure 6A:
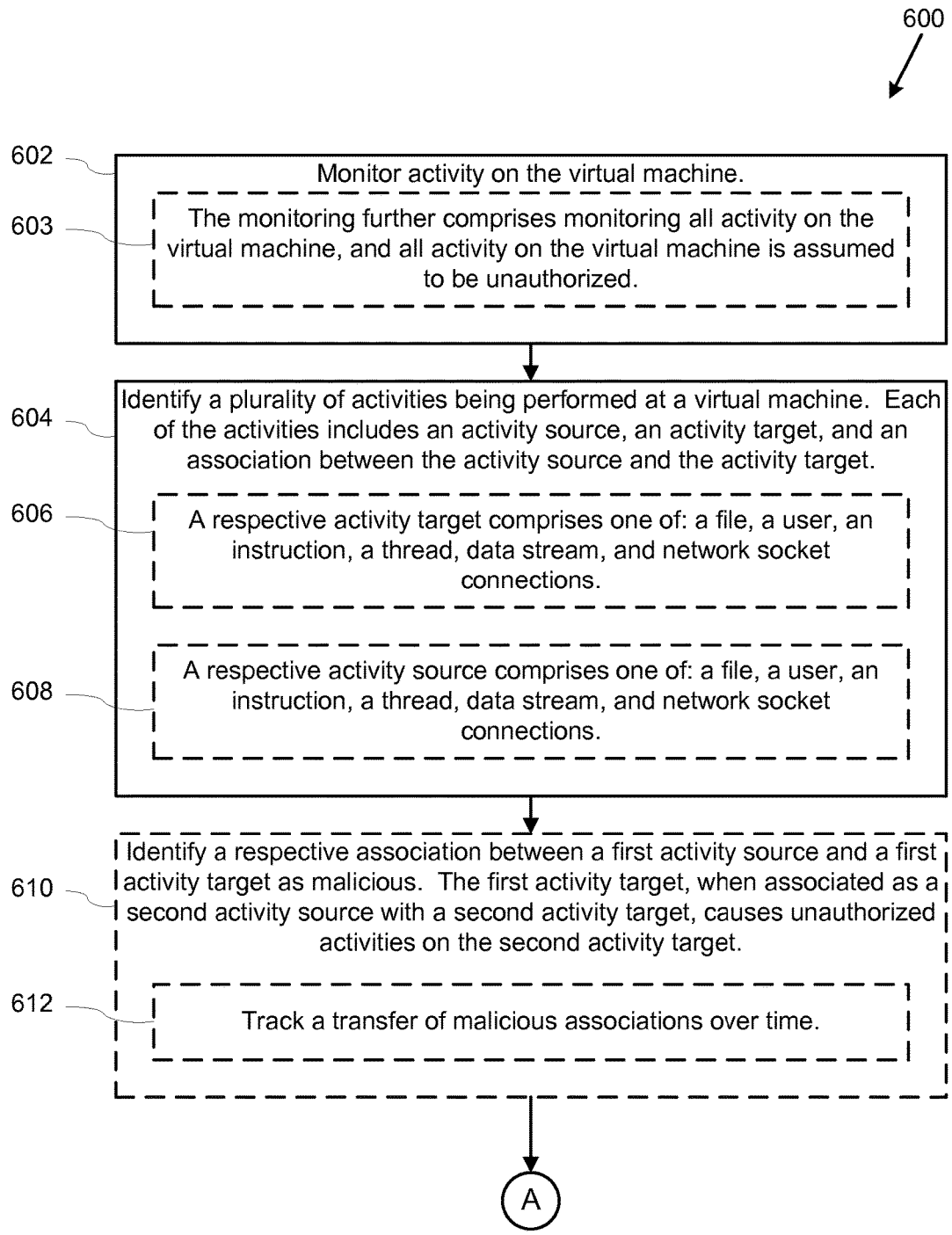
FIGS. 6A-6C are flowcharts representing a method of identifying unauthorized activities on a computer system, in accordance with some embodiments.
Figure 6B:
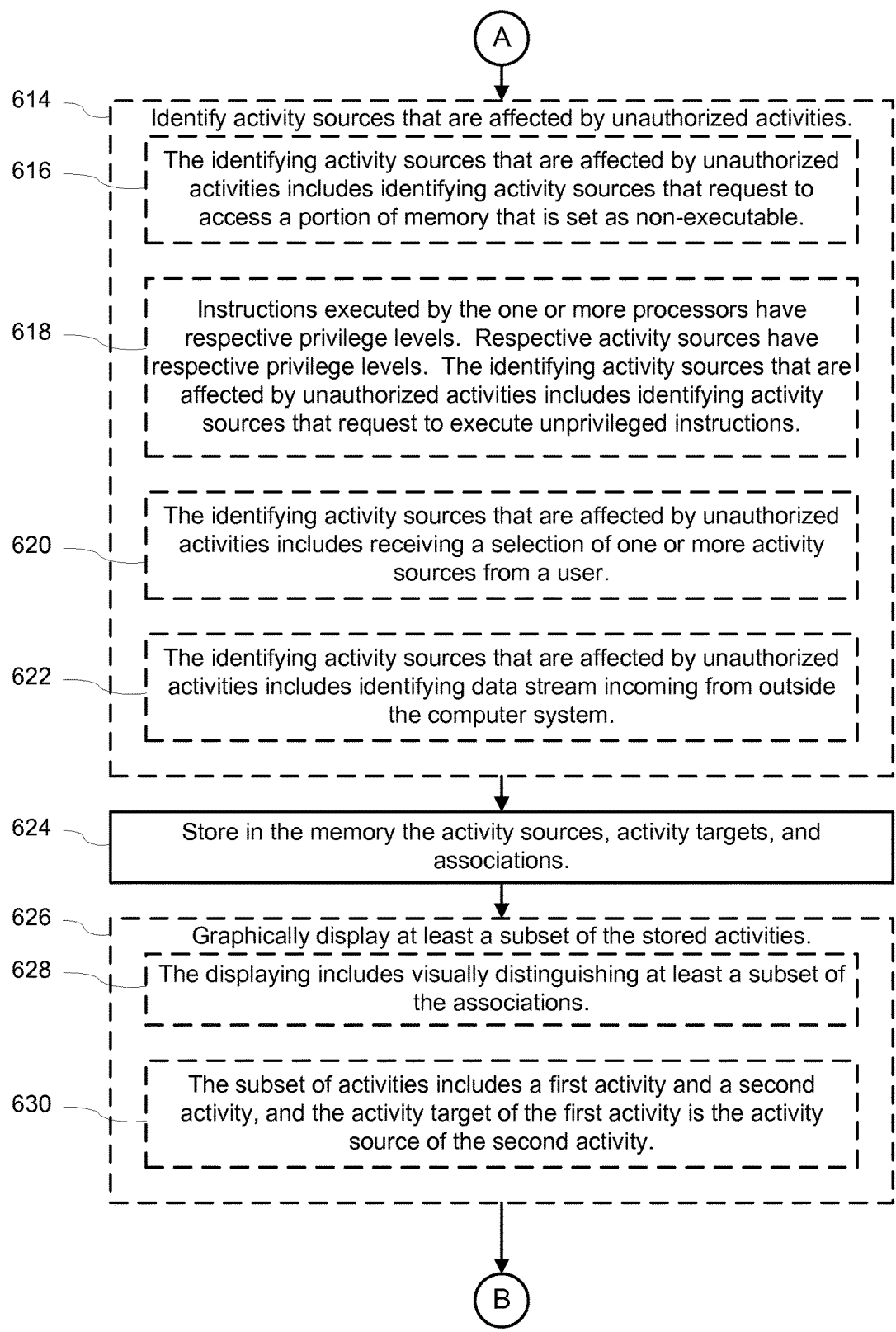
Figure 6C:
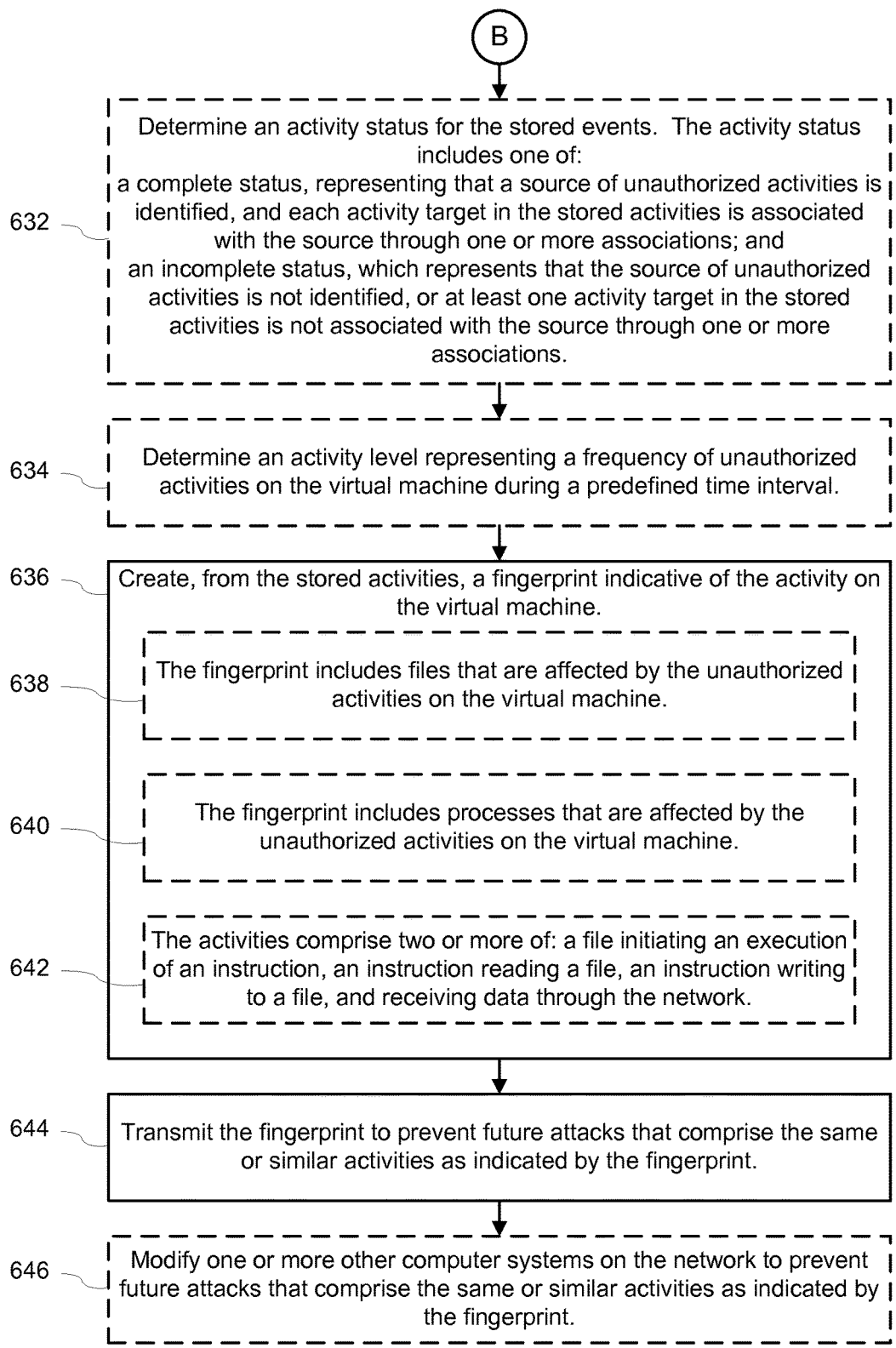

FIGS. 6A-6C are flowcharts representing a method 600 of identifying unauthorized activities on a computer system (e.g., the virtual machine 113-1) attached to a computer network, in accordance with some embodiments. The computer-implemented method 600 is performed at a decoy network device (e.g., 106 in FIG. 1B) having one or more processors and memory storing a virtual machine and a virtual machine monitor supervising the virtual machine. The memory also stores one or more programs for execution by the one or more processors to perform the method. Typically, the one or more programs executed by the one or more processors to perform the method are executed at the virtual machine monitor.

The decoy network device monitors (602) activity on the virtual machine. In some embodiments, the decoy network device monitors a predefined set of activity on the virtual machine. In some embodiments, the decoy network device monitors all activity related to incoming data stream on the virtual machine, based on an assumption that all incoming data stream on the virtual machine is unauthorized (e.g., FIGS. 3A-3D). In some embodiments, the decoy network device monitors activity based on the monitoring priority.

In some embodiments, the monitoring further includes monitoring all activity on the virtual machine, and all activity on the virtual machine is assumed (603) to be unauthorized, because the virtual machine is not configured to provide user services (e.g., email, web, or file services, etc.) and no authorized user would need to access the virtual machine. In some embodiments, all incoming data packet on the virtual machine is assumed to be unauthorized.

The decoy network device identifies (604) a plurality of activities being performed at the virtual machine. Each of the activities includes an activity source, an activity target, and an association between the activity source and the activity target. For example, the activity between the file X 310 and the process B 314 in FIG. 3D includes the file X 310 as an activity source, the process B 314 as an activity target, and the association represented by the arrow from the file X 310 to the process B 314.

In some embodiments, a respective activity target comprises (606) one of: a file, a user, an instruction (such as computer processes or system calls), a thread (e.g., a thread of processes), data stream (e.g., network packets), and network socket connections (or sockets). In some embodiments, the respective activity target is an Internet Protocol address.

In some embodiments, a respective activity source comprises (608) one of: a file, a user, an instruction (such as computer processes or system calls), a thread (e.g., a thread of processes), data stream (e.g., network packets), and network socket connections (or sockets). In some embodiments, the respective activity source is an Internet Protocol address.

Figure 3C:
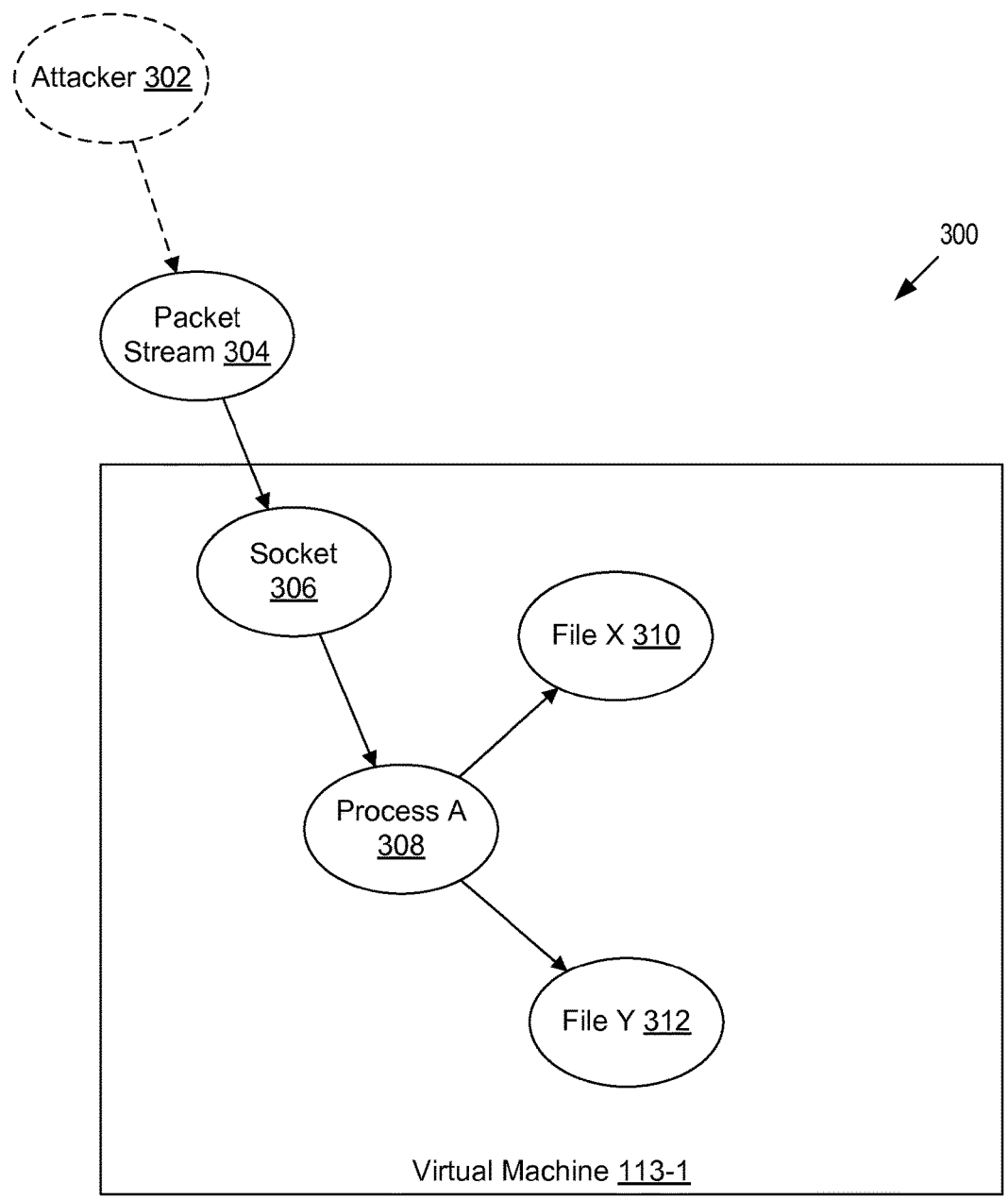
Figure 3D:
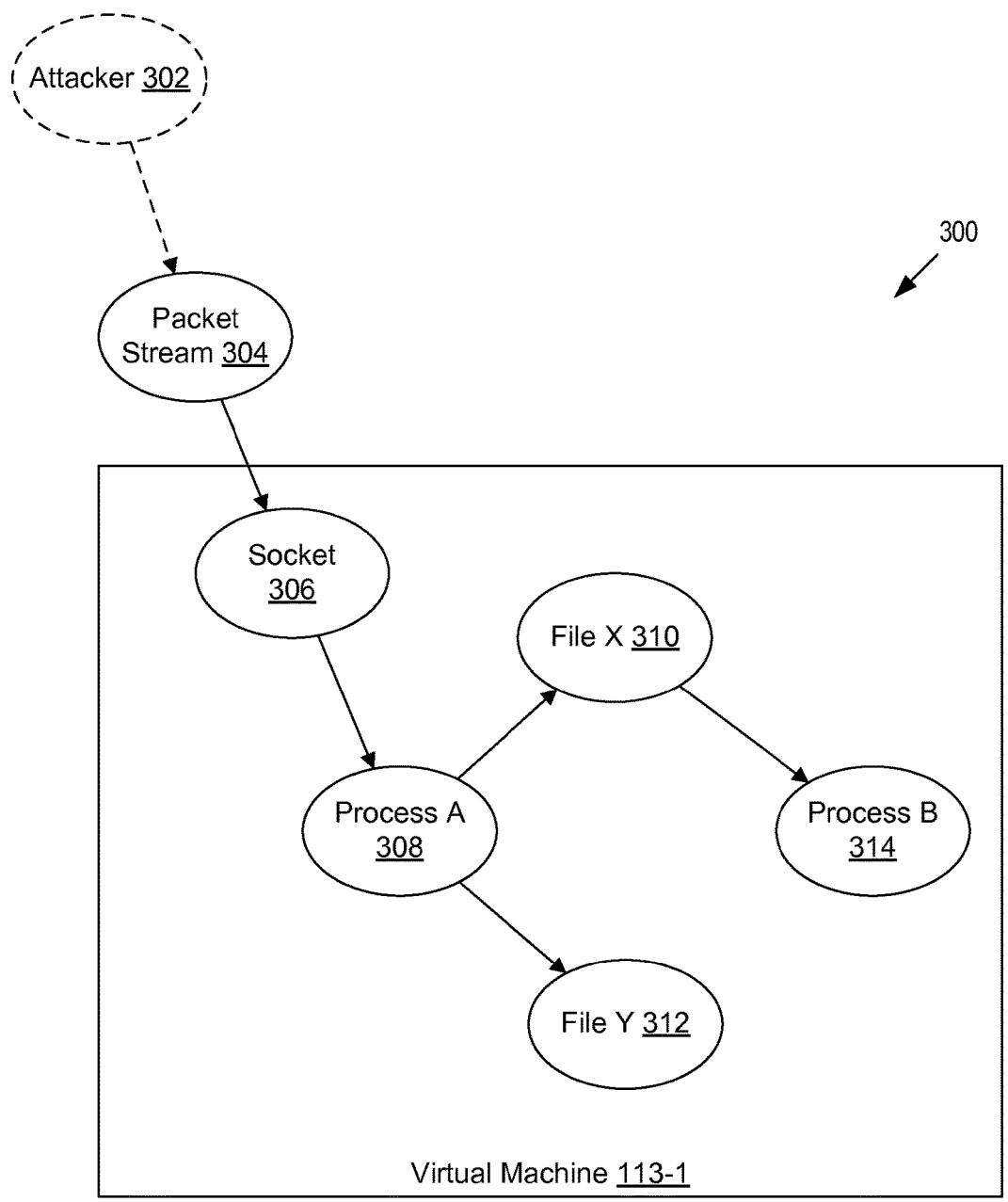

In some embodiments, the decoy network device identifies (610) a respective association between a first activity source and a first activity target as unauthorized. The first activity target, when associated as a second activity source with a second activity target, causes unauthorized activities on the second activity target. For example, we turn to illustrations in FIGS. 3B-3C. Data from the socket 306 modifies the process A 308 so that the process A 308 performs unauthorized activities (FIG. 3B). Therefore, the socket 306 is an activity source in relation to the process A 308, which is an activity target in relation to the socket 306. Then, as shown in FIG. 3C, the process A 308 modifies the file X 310, performing unauthorized activities (e.g., corrupting data or writing a malicious code). The process A 308, as an activity source to the file X 310, causes unauthorized activities on the file X 310. By identifying that the process A 308 performed unauthorized activities, the process A 308 is determined to be affected by the unauthorized activities, and the association between the socket 306 and the process A 308 is determined to be malicious (i.e., unauthorized).

In some embodiments, the decoy network device tracks (612) a transfer of malicious associations over time. For example, as shown in FIG. 5A, the decoy network device stores propagation of unauthorized activities (or malicious associations) as a function of time. This allows time-based analysis of the unauthorized activities, and preventing unauthorized activities based on time or sequence-based filters.

In some embodiments, the decoy network device identifies (614) activity sources that are affected by unauthorized activities. In some embodiments, the identifying activity sources that are affected by unauthorized activities includes (616) identifying activity sources that request to access a portion of memory that is set as non-executable. This can be achieved by data execution prevention (DEP) mechanisms. For example, microprocessors manufactured by Intel Corporation (Santa Clara, Calif.) allow setting one or more portions of the memory as non-executable (e.g., using a non-executable bit in respective page table entries), and generate an exception when there is an attempt to execute an instruction that is set as non-executable. Similarly, operating systems sold by Microsoft Corporation (Redmond, Wash.) has an analogous function implemented in the operating system (e.g., Windows XP, Windows 7, etc.).

In some embodiments, instructions executed by the one or more processors have (618) respective privilege levels. Respective activity sources have respective privilege levels, and the identifying activity sources that are affected by unauthorized activities includes identifying activity sources that request to execute unprivileged instructions. For example, low level processes (or fundamental OS processes) typically require a fundamental privilege level (e.g., privilege levels 0, 1, and 2 in a microprocessor architecture provided by Intel Corporation), and most applications run at a different privilege level (e.g., privilege level 3 in Intel Architecture). An application running at the privilege level 3 is unprivileged to run a privilege level 0 process. When the privilege level 3 application attempts to run a privilege level 0 process, such activity is identified as an unauthorized activity.

In some embodiments, the identifying activity sources that are affected by unauthorized activities includes (620) receiving a selection of one or more activity sources from a system administrator. For example, a system administrator may suspect that a certain file or process is affected by unauthorized activities, and select the file or process as affected. The decoy network device monitors activity sources and activity targets associated with the selected file or process, thereby identifying additional unauthorized activities.

In some embodiments, the identifying activity sources that are affected by unauthorized activities includes (622) identifying a data stream incoming from outside the computer system. As discussed above, all incoming data stream on a decoy system is assumed to be affected by unauthorized activities.

The decoy network device stores (624) the activity sources, activity targets, and associations in the memory. For example, the decoy network device 106 stores unauthorized activity data 502 (e.g., as illustrated in FIG. 5A) in memory 206 (as shown in FIG. 2) or in the database server 128 (as shown in FIG. 2).

In some embodiments, the decoy network device graphically displays (626) at least a subset of the stored activities. For example, the graphical representation can be an activity diagram as shown in FIGS. 3A-3D and 4A-4E.

In some embodiments, the displaying includes (628) visually distinguishing at least a subset of the associations (e.g., in FIG. 4E, certain associations are visually distinguished with bold lines. Alternatively, certain associations are visually distinguished with any other visual indications, such as color, shape, icons, etc.). In some embodiments, the visually distinguishing includes visually distinguishing at least a subset of the associations based on the associated probability.

In some embodiments, the subset of activities includes (630) a first activity and a second activity, and the activity target of the first activity is the activity source of the second activity. For example, FIG. 3C illustrates the first activity between the socket 306 and the process A 308 and the second activity between the process A 308 and the file X 310. The process A 308 is the activity target of the first activity and the activity source of the second activity. In other words, the first activity and the second activity are connected through the process A 308. In FIG. 3C, both the first activity and the second activity are graphically illustrated.

In some embodiments, the decoy network device determines (632) an activity status for the stored events. The activity status includes one of: a complete status and an incomplete status. The complete status represents that a source of unauthorized activities is identified, and each activity target in the stored activities is associated with the source through one or more associations (e.g., in FIG. 4D, each activity is associated with the source, packet stream 304 through one or more associations). The incomplete status represents that the source of unauthorized activities is not identified, or at least one activity target in the stored activities is not associated with the source through one or more associations (e.g., in FIG. 4A, the source is not identified, and activities are not associated with the source).

In some embodiments, the decoy network device determines (634) an activity level representing a frequency of unauthorized activities on the virtual machine during a predefined time interval (e.g., frequency 508 in FIG. 5A).

In some embodiments, the decoy network device determines a probability of a respective association (or a probability/confidence of an unauthorized association). The probability represents likelihood that the association is malignant (or benign). For example, if the process A 308 reads the file Y 312 (in FIG. 4B), the file Y 312 is not modified, and the association is not malignant. The probability for the association between the process A 308 and the file Y 312 is 0%. However, if the process A 308 writes to (or modifies) the file X 310 (in FIG. 4B), the association can be malignant. If we know that the process A 308 is affected by the unauthorized activities, the probability for the association between the process A 308 and the file X 310 is 100%. If we do not know that the process A 308 is affected by the unauthorized activities, the probability for the association between the process A 308 and the file X 310 is a predefined number (e.g., 50%). If the file X 310, in turn, calls the process B 314, the association between the file X 310 and the process B 314 can be assigned a probability based on a predefined rule (e.g., 25%=50% of the probability associated with the file X 310, which is 50%).

In some embodiments, the probability is used to adjust monitoring priority for the introspection module. For example, if the association between the process A 308 and the file Y 312 has 0% probability, the association between the process A 308 and the file X 310 has 50% probability, and the association between the file X 310 and the process B 314 has 25% probability, the monitoring priority would be placed in the order of the process A 308 (which can be 100% affected by unauthorized activities), the file X 310 with a 50% probability association, the process B 314 with a 25% probability association, and the file Y 312 with a 0% probability association.

The decoy network device creates (636) a fingerprint indicative of the activity on the virtual machine from the stored activities. For example, the fingerprint can be fingerprint 580-1 in FIG. 5B, fingerprint 580-2 in FIG. 5C, or any other fingerprint described herein. The fingerprint 580-1 can be created directly from the stored activities (e.g., unauthorized activity data 502). The fingerprint 580-2 can be created by analyzing unauthorized activity data 502 (in particular the activity sources 512) or collecting additional data associated with the activity sources 512 (e.g., calculating a checksum value of an activity source 512, etc.).

In some embodiments, the fingerprint includes (638) files that are affected by unauthorized activities on the virtual machine. For example, the activity source 512 in the fingerprint 580-1 can be a file or file information (e.g., file name, location, size, checksum value, etc.).

In some embodiments, the fingerprint includes (640) processes that are affected by the unauthorized activities on the virtual machine. For example, the activity source 512 in the fingerprint 580-1 can be a process or process information (e.g., process name, size, privilege level, related processes, etc.).

In some embodiments, the fingerprint includes one or more of: system calls' arguments and returns, device and memory input-output, driver calls' arguments and returns, library calls' arguments and returns, branching information, instruction pointer jumps, and raw network information collected from a respective virtual machine 113 or a respective decoy operating system 112.

In some embodiments, the fingerprint includes one or more of: port numbers, data streams, file uploads, file downloads, keystrokes, ASCII or binary files, malicious payloads, operating system configuration changes (e.g., new or updated registry keys in windows) and memory manipulation attempts.

In some embodiments, the activities comprise (642) two or more of: a file initiating an execution of an instruction, an instruction reading a file, an instruction writing to a file, and receiving data through the network.

The decoy network device transmits (644) the fingerprint to one or more protected network devices 136 to prevent future attacks that comprise the same or similar activities as indicated by the fingerprint. In some embodiments, the decoy network device transmits the fingerprint to the IDS/IPS system 142 to prevent future attacks that comprise the same or similar activities on one or more protected network devices 136.

In some embodiments, one or more other computer systems (e.g., protected network devices 136) on the network are modified (646) to prevent future attacks that comprise the same or similar activities as indicated by the fingerprint (e.g., in FIG. 1A, the IDS/IPS system modifies at least one of the protected network device(s) 136 to prevent future attacks that comprise the same or similar activities).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

For example, although the activity source 512 and the activity target 514 are described with respect to processes, threads, files, addresses, instructions, messages, hardware components, etc., persons skilled in the art would recognize that similar methods can be used with respect to other types of activity sources and activity targets. In some embodiments, the analysis engine is configured to maintain several layers of network diagrams, where each layer uses the layer beneath it as input and providing more generalized representations of the unauthorized activity as output. For example, a low-level layer might consist of a process reading from a file and subsequently writing many new files. In some cases, the analysis engine might identify this low level pattern as a representation of a file archive being unpacked, and generate a higher-level layer that includes an unpacking process. This exemplary generalization allows the system to identify common elements of attacks, identify classes of attack that have not been seen before (e.g., zero-day attacks), and generate higher-quality signatures. A layer including the level of detail appropriate to the context may be selected for analysis.

Moreover, the methods described herein need not be restricted to analysis of a single virtualized operating system but, rather, are able to follow a chain of unauthorized activity across multiple virtualized operating systems. This is important in identifying and thwarting advanced threats that involve multiple attackers spread across multiple systems and that evolve over long periods of time.

Furthermore, although the methods are described with respect to security application, it should be appreciated that similar methods can be used generally for monitoring behavior of a computer system that follows a source event. For example, similar methods can be used for tracking a user behavior on a system, and/or profiling application behavior for performance improvement or debugging purposes.

What is claimed is:

1. A computer implemented method of identifying unauthorized activities on a first computer system attached to a computer network, wherein the first computer system comprises one or more processors and memory, the method comprising:
   monitoring activity on the first computer system;
   identifying a plurality of activities being performed at the first computer system, wherein each of the activities includes an activity source, an activity target, and an association between the activity source and the activity target;
   storing in the memory a data structure that identifies the activity sources, the activity targets, and the associations for the plurality of activities; and
   transmitting to one or more computer systems other than the first computer system information identifying one or more of the activity sources, the activity targets, and the associations for preventing future attacks, to the one or more computer systems, associated with the one or more of the activity sources, the activity targets, and the associations.

2. The method of claim 1, wherein the monitoring further comprises monitoring all activity on the first computer system.

3. The method of claim 1, further comprising:
   creating, from the stored information, a fingerprint indicative of the activity on the first computer system.

4. The method of claim 1, wherein the activities comprise two or more of: a file initiating an execution of an instruction, an instruction reading a file, an instruction writing to a file, and receiving data through the network.

5. The method of claim 1, wherein a respective activity target comprises one of: a file, a user, an instruction, a thread, data stream, and network socket connections.

6. The method of claim 1, wherein a respective activity source comprises one of: a file, a user, an instruction, a thread, data stream, and network socket connections.

7. The method of claim 1, further comprising:
   graphically displaying at least a subset of the stored activities.

8. The method of claim 7, wherein the displaying includes visually distinguishing at least a subset of the associations.

9. The method of claim 1, wherein an activity target of a first activity of the plurality of activities is an activity source of a second activity of the plurality of activities.

10. The method of claim 1, further comprising:
    identifying a respective association between a first activity source and a first activity target as unauthorized, wherein the first activity target, when associated as a second activity source with a second activity target, causes unauthorized activities on the second activity target.

11. The method of claim 10, further comprising:
    tracking a transfer of malicious associations over time.

12. The method of claim 1, further comprising:
    identifying activity sources that are affected by unauthorized activities.

13. The method of claim 12, wherein the identifying activity sources that are affected by unauthorized activities includes identifying activity sources that request to access a portion of memory that is set as non-executable.

14. The method of claim 12, wherein:
    instructions executed by the one or more processors have respective privilege levels;
    respective activity sources have respective privilege levels; and
    the identifying activity sources that are affected by unauthorized activities includes identifying activity sources that request to execute underprivileged instructions.

15. The method of claim 12, wherein the identifying activity sources that are affected by unauthorized activities includes identifying data stream incoming from outside the first computer system.

16. The method of claim 1, further comprising:
    determining an activity status for the stored events, the activity status comprising one of:
       a complete status, representing that a source of unauthorized activities is identified, and each activity target in the stored activities is associated with the source through one or more associations; and
       an incomplete status, which represents that the source of unauthorized activities is not identified, or at least one activity target in the stored activities is not associated with the source through one or more associations.

17. The method of claim 1, further comprising:
    determining an activity level representing a frequency of unauthorized activities on the first computer system during a predefined time interval.

18. The method of claim 1, further comprising:
    identifying a respective activity as unauthorized based on a determination that the respective activity is associated with an unauthorized activity that is distinct from the respective activity.

19. The method of claim 1, wherein the association includes a type that represents whether or not the activity source has modified the activity target to perform the unauthorized activities.

20. A first computer system, comprising:
one or more processors; and
memory storing one or more programs, the one or more programs including instructions for:
monitoring activity on the first computer system;
identifying a plurality of activities being performed at the first computer system, where each of the activities includes an activity source, an activity target, and an association between the activity source and the activity target;
storing in the memory a data structure that identifies the activity sources, the activity targets, and the associations for the plurality of activities; and
transmitting to one or more computer systems other than the first computer system information identifying one or more of the activity sources, the activity targets, and the associations for preventing future attacks, to the one or more computer systems, associated with the one or more of the activity sources, the activity targets, and the associations.

21. A computer readable storage medium, including one or more programs for execution by one or more processors of a first computer system, the one or more programs including instructions for:
monitoring activity on the first computer system;
identifying a plurality of activities being performed at the first computer system, where each of the activities includes an activity source, an activity target, and an association between the activity source and the activity target;
storing in memory of the first computer system a data structure that identifies the activity sources, the activity targets, and the associations for the plurality of activities; and
transmitting to one or more computer systems other than the first computer system information identifying one or more of the activity sources, activity targets, and associations for preventing future attacks, to the one or more computer systems, associated with the one or more of the activity sources, the activity targets, and the associations.

* * * * *